United States Patent
Glatt

(10) Patent No.: US 12,544,404 B2
(45) Date of Patent: Feb. 10, 2026

(54) COMPOSITIONS AND METHODS FOR TREATING BONE INJURY

(71) Applicant: Board of Regents, The University of Texas System, Austin, TX (US)

(72) Inventor: Vaida Glatt, San Antonio, TX (US)

(73) Assignee: Board of Regents, The University of Texas System, Austin, TX (US)

(*) Notice: Subject to any disclaimer, the term of this patent is extended or adjusted under 35 U.S.C. 154(b) by 976 days.

(21) Appl. No.: 17/277,093

(22) PCT Filed: Sep. 17, 2019

(86) PCT No.: PCT/US2019/051541
§ 371 (c)(1),
(2) Date: Mar. 17, 2021

(87) PCT Pub. No.: WO2020/061067
PCT Pub. Date: Mar. 26, 2020

(65) Prior Publication Data
US 2022/0016162 A1    Jan. 20, 2022

Related U.S. Application Data

(60) Provisional application No. 62/845,500, filed on May 9, 2019, provisional application No. 62/732,534, filed on Sep. 17, 2018.

(51) Int. Cl.
*A61K 35/14* (2015.01)
*A61K 9/00* (2006.01)
(Continued)

(52) U.S. Cl.
CPC ............ *A61K 35/14* (2013.01); *A61K 9/0024* (2013.01); *A61K 35/16* (2013.01); *A61K 35/18* (2013.01);
(Continued)

(58) Field of Classification Search
CPC ...... A61K 35/14; A61K 9/0024; A61K 35/16; A61K 35/18; A61K 35/19; A61K 38/1825;
(Continued)

(56) References Cited

U.S. PATENT DOCUMENTS

| 7,348,411 B2 | 3/2008 | Petrescu |
| 7,955,603 B2 | 6/2011 | Richardson et al. |

(Continued)

FOREIGN PATENT DOCUMENTS

| AU | 2019344801 | 4/2021 |
| CA | 3113691 | 3/2021 |

(Continued)

OTHER PUBLICATIONS

Shehter-Harkavyk, et al., On the Relationship between the adhesive properties and the structural features of fibrin sealants, 2004, J. Adhesion Sci. Technol., vol. 18, No. 12, 1415-1425 (Year: 2004).*

(Continued)

*Primary Examiner* — Bethany P Barham
*Assistant Examiner* — Ayaan A Alam
(74) *Attorney, Agent, or Firm* — BALLARD SPAHR LLP

(57) ABSTRACT

The disclosure relates to compositions and methods of treating, improving, and accelerating the healing of large segmental bone defects in a subject. The method comprises administering to a patient in need of treatment an effective amount of whole blood, sodium citrate, ecarin and BMP-2.

13 Claims, 8 Drawing Sheets

(51) Int. Cl.

| | |
|---|---|
| *A61K 35/16* | (2015.01) |
| *A61K 35/18* | (2015.01) |
| *A61K 35/19* | (2015.01) |
| *A61K 38/18* | (2006.01) |
| *A61K 38/36* | (2006.01) |
| *A61K 38/48* | (2006.01) |
| *A61K 47/02* | (2006.01) |
| *A61K 47/12* | (2006.01) |
| *A61L 27/22* | (2006.01) |
| *A61L 27/36* | (2006.01) |
| *A61L 27/44* | (2006.01) |
| *A61L 27/56* | (2006.01) |
| *A61P 19/08* | (2006.01) |

(52) U.S. Cl.
CPC .......... *A61K 35/19* (2013.01); *A61K 38/1825* (2013.01); *A61K 38/1866* (2013.01); *A61K 38/1875* (2013.01); *A61K 38/36* (2013.01); *A61K 38/4813* (2013.01); *A61K 38/482* (2013.01); *A61K 38/4833* (2013.01); *A61K 47/02* (2013.01); *A61K 47/12* (2013.01); *A61L 27/225* (2013.01); *A61L 27/227* (2013.01); *A61L 27/3616* (2013.01); *A61L 27/446* (2013.01); *A61L 27/56* (2013.01); *A61P 19/08* (2018.01); *A61L 2300/254* (2013.01); *A61L 2300/414* (2013.01); *A61L 2430/02* (2013.01)

(58) Field of Classification Search
CPC ............ A61K 38/1866; A61K 38/1875; A61K 38/36; A61K 38/4813; A61K 38/482; A61K 38/4833; A61K 47/02; A61K 47/12; A61P 19/08; A61L 27/225; A61L 27/227; A61L 27/3616; A61L 27/446; A61L 27/56; A61L 2300/254; A61L 2300/414; A61L 2430/02
See application file for complete search history.

(56) References Cited

U.S. PATENT DOCUMENTS

| | | | |
|---|---|---|---|
| 8,197,840 B2 | 6/2012 | Vukicevic et al. | |
| 9,320,653 B2 | 4/2016 | Vournakis et al. | |
| 11,596,712 B2 | 3/2023 | Vukicevic et al. | |
| 11,642,437 B2 | 5/2023 | Vukicevic et al. | |
| 2009/0317438 A1* | 12/2009 | Vukicevic ............... | A61K 35/14 424/94.64 |
| 2010/0028311 A1* | 2/2010 | Motlagh ............... | A61L 27/225 424/93.7 |
| 2011/0268790 A1 | 11/2011 | Camire et al. | |
| 2012/0190832 A1 | 7/2012 | Herr et al. | |
| 2013/0058906 A1 | 3/2013 | Turzi | |
| 2014/0271610 A1* | 9/2014 | San Antonio ....... | A61L 26/0052 424/94.67 |
| 2017/0128617 A1* | 5/2017 | DeAnglis ................ | A61L 15/32 |
| 2017/0189537 A1 | 7/2017 | Senderoff et al. | |
| 2018/0051093 A1 | 2/2018 | Wilmen et al. | |
| 2018/0153969 A1 | 6/2018 | Turzi | |

FOREIGN PATENT DOCUMENTS

| | | |
|---|---|---|
| CN | 201980069277.0 | 4/2021 |
| EP | 2049040 B1 | 1/2013 |
| EP | 19861389.5 | 7/2021 |
| EP | 2019861389 | 7/2021 |
| JP | 2010-505766 A | 2/2010 |
| JP | 2021539484 | 3/2021 |
| KR | 1020217010893 | 4/2021 |
| WO | WO 1996/003432 A1 | 2/1996 |
| WO | WO 1996/017633 A1 | 6/1996 |
| WO | WO 2002/000272 A2 | 1/2002 |
| WO | WO 2007/092147 A2 | 8/2007 |
| WO | WO 2008/011192 A2 | 1/2008 |
| WO | WO 2017/083248 A1 | 5/2017 |
| WO | WO 2019/076484 A1 | 4/2019 |
| WO | PCT/US2019/051541 | 9/2019 |

OTHER PUBLICATIONS

U.S. Appl. No. 62/732,534, filed Sep. 17, 2018, Vaida Glatt.
U.S. Appl. No. 62/845,500, filed May 9, 2018, Vaida Glatt.
Noori, A., et al. A review of fibrin and fibrin composites for bone tissue enginerring. International Journal of Nanomedicine. 2017; 12: 4937-4961.
Pretorius, E., et al. Comparative Scanning Electron Microscopy of Platelets and Fibrin Networks of Human and Differents Animals. Int. J. Morphol. 2009; 27(1): 69-76.
Van Rooy, et al. Platelet hyperactivity and fibrin clot structure in transient ischemic attack individuals in the presence of metabolic syndrome: a microscopy and thromboelastography study. Cardiovascular Diabetology. 2015; 14: 86.
Badami AS et al. Effect of fiber diameter on spreading, proliferation, and differentiation of osteoblastic cells on electrospun poly(lactic acid) substrates. Biomaterials. 2006;27: 596-606.
Belmont Jr. PJ, et al. Combat wounds in Iraq and Afghanistan from 2005 to 2009. J Trauma Acute Care Surg. 2012;73: 3-12.
Bovill EG, et al. Evidence that meizothrombin is an intermediate product in the clotting of whole blood. Arterioscler Thromb Vasc Biol. 1995;15: 754-758.
Butler MS. Natural products to drugs: natural product-derived compounds in clinical trials. Nat Prod Rep. 2008; 25: 475-516.
Busenlechner D, et al. Sinus augmentation analysis revised: the gradient of graft consolidation. Clin Oral Implants Res. 2009;20: 1078-1083.
Carlisle CR, et al. The mechanical stress-strain properties of single electrospun collagen type I nanofibers. Acta Biomater. 2010; 6: 2997-3003.
Carragee EJ, et al. A critical review of recombinant human bone morphogenetic protein-2 trials in spinal surgery: emerging safety concerns and lessons learned. Spine J. 2011;11: 471-491.
Chernysh IN, et al. Fibrin clots are equilibrium polymers that can be remodeled without proteolytic digestion. Sci Rep. 2012;2: 879.
Choi B-H, et al. Effect of platelet-rich plasma on bone regeneration in autogenous bone graft. Int J Oral Maxillofac Surg. 2004;33: 56-9.
Choukroun J, et al. Platelet-rich fibrin (PRF): a second-generation platelet concentrate. Part V: histologic evaluations of PRF effects on bone allograft maturation in sinus lift. Oral Surg Oral Med Oral Pathol Oral Radiol Endod. 2006;101: 299-303.
Diesen DL and Lawson JH. Bovine thrombin: history, use, and risk in the surgical patient. Vascular. 2008;16: S29-36.
Eichhorn SJ and Sampson WW. Statistical geometry of pores and statistics of porous nanofibrous assemblies. J R Soc Interface. 2005;2: 309-318.
Enneking WF and Campanacci DA. Retrieved human allografts: a clinicopathological study. J Bone Joint Surg Am. 2001;83(7):971-986.
Fischer H. A Guide to U.S. Military Casualty Statistics: Operation Freedom's Sentinel, Operation Inherent Resolve, Operation New Dawn, Operation Iraqi Freedom, and Operation Enduring Freedom. Congr Res Serv. 2015; 7.
Gabriel DA, et al. The effect of fibrin structure on fibrinolysis. J Biol Chem. 1992;267: 24259-63.
Gantenbein-Ritter B, et al. Confocal imaging protocols for live/dead staining in three-dimensional carriers. Methods Mol Biol. 2011;740: 127-40.
Glatt V, et al. Reverse Dynamization: Influence of Fixator Stiffness on the Mode and Efficiency of Large-Bone-Defect Healing at Different Doses of rhBMP-2. J Bone Joint Surg Am. 2016;98: 677-87.
Glatt V et al. Design, characterisation and in vivo testing of a new, adjustable stiffness, external fixator for the rat femur. Eur Cell Mater. 2012;23: 289-98; discussion 299.

(56) References Cited

OTHER PUBLICATIONS

Glatt V, et al. Improved healing of large segmental defects in the rat femur by reverse dynamization in the presence of bone morphogenetic protein-2. J Bone Joint Surg Am. Nov. 21, 2012;94(22):2063-73.

Glatt V and Matthys R. Adjustable stiffness, external fixator for the rat femur osteotomy and segmental bone defect models. J Vis Exp. 2014:e51558.

Han SM, et al. Efficacy and safety of alfimeprase in patients with acute peripheral arterial occlusion (PAO). J Vasc Surg. 2010;51: 600-9.

He L, et al. A comparative study of platelet-rich fibrin (PRF) and platelet-rich plasma (PRP) on the effect of proliferation and differentiation of rat osteoblasts in vitro. Oral Surgery, Oral Med Oral Pathol Oral Radiol Endodontology. 2009;108: 707-713.

Hernandez-Fernandez A, et al. Effect of administration of platelet-rich plasma in early phases of distraction osteogenesis: an experimental study in an ovine femur model. Injury. 2013;44: 901-7.

Hong T-T, et al. Effect of thrombolysis on myocardial injury: recombinant tissue plasminogen activator vs. alfimeprase, Am J Physiol Heart Circ Physiol. 2006;290: H959-67.

Huntington JA. Thrombin plasticity. Biochim Biophys Acta—Proteins Proteomics. 2012;1824: 246-252.

Hutton R. Action of snake venom components on the haemostatic system. Blood Rev. 1993;7(3): 176-189.

Iqbal J, et al. Platelet-rich plasma for the replenishment of bone. Curr Osteoporos Rep. 2011;9: 258-263.

Kanakaris NK, Giannoudis PV. The health economics of the treatment of long-bone non-unions. Injury. 2007; 38 Suppl 2: S77 S84.

Kang TS, et al. Enzymatic toxins from snake venom: structural characterization and mechanism of catalysis. FEBS J. 2011;278: 4544-76.

Kaur S, et al. Influence of electrospun fiber size on the separation efficiency of thin film nanofiltration composite membrane, J Memb Sci. 2012; 392-393: 101-111.

Khan SN, et al. The biology of bone grafting. J Am Acad Orthop Surg. 2005;13: 77-86.

King GF. Venoms as a platform for human drugs: translating toxins into therapeutics. Expert Opin Biol Ther. 2011; 11:1469-84.

Krishnaswamy S, et al. The prothrombinase-catalyzed activation of prothrombin proceeds through the intermediate meizothrombin in an ordered, sequential reaction. J Biol Chem. 1986; 261: 8977-8984.

Kurikchy MQ, et al. Histological evaluation of bone healing using organic bovine bone in combination with platelet-rich plasma (an experimental study on rabbits). Clin Oral Investig. 2013;17: 897-904.

Lai BFL, et al. The influence of poly-N-[(2,2-dimethyl-1,3-dioxolane)methyl]acrylamide on fibrin polymerization, cross-linking and clot structure. Biomaterials. Elsevier Ltd; 2010;31: 5749-5758.

Li H, et al. Anterior lumbar interbody fusion with carbon fiber cage loaded with bioceramics and platelet-rich plasma. An experimental study on pigs. Eur Spine J. 2004;13: 354-8.

Liu W, et al. Electrospun nanofibers for regenerative medicine. Adv Healthc Mater. 2012; 1: 10-25.

Maes C, et al. Osteoblast precursors, but not mature osteoblasts, move into developing and fractured bones along with invading blood vessels. Dev Cell;2010;19: 329-344.

Marx RE, et al. Oral Surg Oral Med Oral Pathol Oral Radiol Endod. Platelet-rich plasma: Growth factor enhancement for bone grafts. 1998;85: 638-46.

Marden LJ, et al. Platelet-derived growth factor inhibits bone regeneration induced by osteogenin, a bone morphogenetic protein, in rat craniotomy defects. J Clin Invest. 1993; 92: 2897-2905.

Mckee Md. Management of segmental bony defects: the role of osteoconductive orthobiologics. J Am Acad Orthop Surg. 2006;14: S163-7.

Meier J and Stocker K. Effects of snake venoms on hemostasis. Crit Rev Toxicol. 1991;21: 171-182.

Nezafati et al., Comparison of pedicled buccal fat pad flap with buccal flap for closure of oro-antral communication; Int J Oral Maxillofac Surg. 2012; 41(5):624-8.

Ofosu FA, et al. A safety review of topical bovine thrombin-induced generation of antibodies to bovine proteins. Clin Ther. 2009;31(4): 679-691.

Oryan A, et al. Platelet-rich plasma for bone healing and regeneration. Expert Opin Biol Ther. 2016;16: 213-32.

Pham QP, et al. Electrospun poly(epsilon-caprolactone) microfiber and multilayer nanofiber/microfiber scaffolds: characterization of scaffolds and measurement of cellular infiltration. Biomacromolecules. 2006;7: 2796-2805.

Pollak AN and Ficke Jr, Extremity War Injuries III Session Moderators. Extremity war injuries: challenges in definitive reconstruction. J Am Acad Orthop Surg. 2008;16: 628-34.

Probst A and Spiegel H-U. Cellular mechanisms of bone repair. J Investig Surg. 1997;10: 77-86.

Pryor ME, et al. Analysis of rat calvaria defects implanted with a platelet-rich plasma preparation: radiographic observations. J Periodontol. 2005;76: 1287-1292.

Ranly DM, et al. Platelet-rich plasma inhibits demineralized bone matrix-induced bone formation in nude mice. J Bone Joint Surg Am. 2007;89: 139-147.

Sanchez AR, et al. Regenerative potential of platelet-rich plasma added to xenogenic bone grafts in peri-implant defects: a histomorphometric analysis in dogs. J Periodontol. 2005; 76: 1637-1644.

Sanchez EF, et al. Chimeric fibrolase: covalent attachment of an RGD-like peptide to create a potentially more effective thrombolytic agent. Thromb Res. 1997; 87: 289-302.

Sands JJ, et al. Antibodies to topical bovine thrombin correlate with access thrombosis. Am J Kidney Dis. 2000; 35(5): 796-801.

Simman R, et al. Role of platelet-rich plasma in acceleration of bone fracture healing. Ann Plast Surg. 2008;61: 337-44.

Soffer E, et al. Oral Surgery, Oral Medicine, Oral Pathology, Oral Radiology, and Endodontics. Fibrin sealants and platelet preparations in bone and periodontal healing. 2003. 95(5): 521-528.

Stansbury LG, et al. Amputations in U.S. military personnel in the current conflicts in Afghanistan and Iraq. J Orthop Trauma. 2008; 22: 43-46.

St. Pierre L, et al. Comparative analysis of prothrombin activators from the venom of Australian elapids. Mol Biol Evol. 2005;22: 1853-1864.

Swenson S, et al. Chimeric derivative of fibrolase, a fibrinolytic enzyme from southern copperhead venom, possesses inhibitory activity on platelet aggregation. Arch Biochem Biophys. 2000; 384: 227-37.

Takeya H, et al. Coagulation factor X activating enzyme from Russell's viper venom (RVV-X). A novel metalloproteinase with disintegrin (platelet aggregation inhibitor)-like and C-type lectin-like domains. J Biol Chem. 1992;267: 14109-14117.

Thibault L, et al. Characterization of blood components prepared from whole-blood donations after a 24-hour hold with the platelet-rich plasma method. Transfusion. 2006;46: 1292-1299.

Tokunaga F, et al. The factor V-activating enzyme (RVV-V) from Russell's viper venom. Identification of isoproteins RVV-V alpha, -V beta, and -V gamma and their complete amino acid sequences. J Biol Chem. 1988; 263: 17471-17481.

Urist MR. Bone morphogenetic protein: the molecularization of skeletal system development. J Bone Miner Res. 1997;12: 343-6.

Van Rooy, et al. Platelet hyperactivity and fibrin clot structure in transient ischemic attack individuals in the presence of metabolic syndrome: a microscopy and thromboelastography® study. Cardiovascular Diabetology, vol. 14, No. 86, 2015.

Wang X, et al. Alteration of blood clot structures by interleukin-1 beta in association with bone defects healing. Sci Rep; 2016;6: 35645.

Wang X, et al. Structural properties of fracture haematoma: current status and future clinical implications. J Tissue Eng Regen Med. 2017; 11(10): 2864-2875.

Weiner BK and Walker M. Efficacy of autologous growth factors in lumbar intertransverse fusions. Spine (Phila Pa 1976). 2003;28:17 1968-1971.

(56) References Cited

OTHER PUBLICATIONS

Weisel JW and Litvinov RI. Mechanisms of fibrin polymerization and clinical implications. Blood. 2013; 121: 1712-1719.
Wheeler DL, et al. Biomechanical evaluation of retrieved massive allografts: preliminary results. Biomed Sci Instrum. 2001; 37: 251-256.
Wolberg AS and Campbell RA. Thrombin generation, fibrin clot formation and hemostasis. Transfus Apher Sci. 2008;38: 15-23.
Wu, et al. Economic burden of illness among US patients experiencing fracture nonunion, Orthopedic Research and Reviews. 2013(5):21-31.
Yasko AW, et al. The healing of segmental bone defects, induced by recombinant human bone morphogenetic protein (rhBMP-2). A radiographic, histological, and biomechanical study in rats. J Bone Joint Surg Am. The American Orthopedic Association; 1992;74: 659-70.
Zura, et al., Epidemiology of Fracture Nonunion in 18 Human Bones. JAMA Surg. Nov. 16, 2016;151(11):e162775.
International Search Report and Written Opinion were mailed on Jan. 17, 2020 by the International Searching Authority for International Application No. PCT/US2019/051541, filed on Sep. 17, 2019 and published as WO/2020/061067 on Mar. 26, 2020 (Applicant-Board of Regents, the University of Texas System) (13 Pages).
International Preliminary Report on Patentability was mailed on Mar. 9, 2021 by the International Searching Authority for International Application No. PCT/US2019/051541, filed on Sep. 17, 2019 and published as WO/2020/061067 on Mar. 26, 2020 (Applicant-Board of Regents, the University of Texas System) (9 Pages).
Isobe, K., et al. Platelet-rich fibrin prepared from stored whole-blood samples. International Journal of Implant Dentistry. 2017;3:6-1.
Kawase, T. Platelet-rich plasma and its derivatives as promising bioactive materials for regenerative medicine: basic principles and concepts underlying recent advances. Odontology. 2015;103:126-135.
Paletta, GA, et al. The repair of osteochondral defects using an exogenous fibrin clot. An experimental study in dogs. The American Journal of Sports Medicine. 1992;20(6):725-731.
Brkljacic, et al., "Exogenous heparin binds and inhibits bone morphogenetic protein 6 biological activity," International Orthopaedics (SICOT) 37:529-541 (2013).
AGES Report 2016.
Brkljacic, et al. "Exogenous heparin binds and inhibits bone morphogenetic protein 6 biological activity", 37(3): 529-41; Int Orthop, 2013.
Dumic-Cule, et al. "Bone morphogenetic proteins in fracture repair," Int Orthop, 42(11): 2619-2626, 2018.
MHRA Scientific Advice, Ref: 614/Recombinant human bone morphogenetic protein 6 (BMP6), Jun. 2014.
Nowak, G. et al. "The Ecarin Clotting Time, a Universal Method to Quantify Direct Thrombin Inhibitors," Pathophysiology. 173-183, 2003/2004.
Shehter-Harkavyk and Bianco-Peled, "On the relationship between the adhesive properties and the structural features of fibrin sealants", Journal of Adhesion Science and Technology, vol. 18, 2004—Issue 12, pp. 1415-1425, 2012.
Song, et al. Identification of a Key Residue Mediating Bone Morphogenetic Protein (BMP)-6 Resistance to Noggin Inhibition Allows for Engineered BMPs with Superior Agonist Activity, J. Biol Chem, vol. 285, Issue 16, P12169-12180, 2010.
Vukicevic, et al. "The clinical use of bone morphogenetic proteins revisited: a novel biocompatible carrier device OSTEOGROW for bone healing," Int Orhop, 38(3): 635-47, 2014.

\* cited by examiner

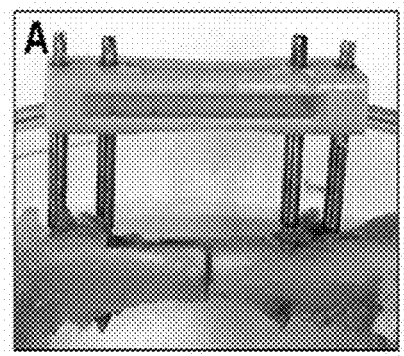
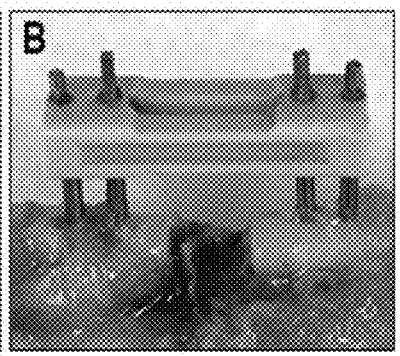
FIG. 3A  FIG. 3B
FIG. 4A  FIG. 4B
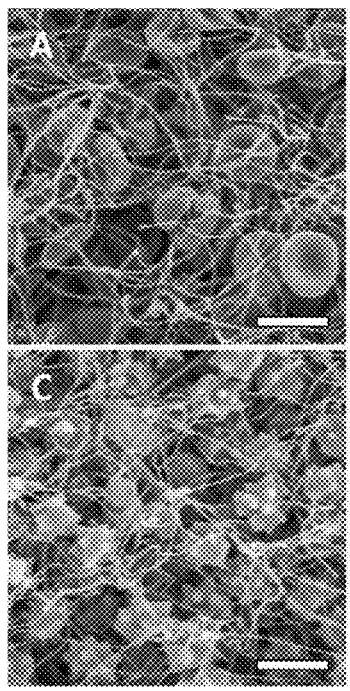
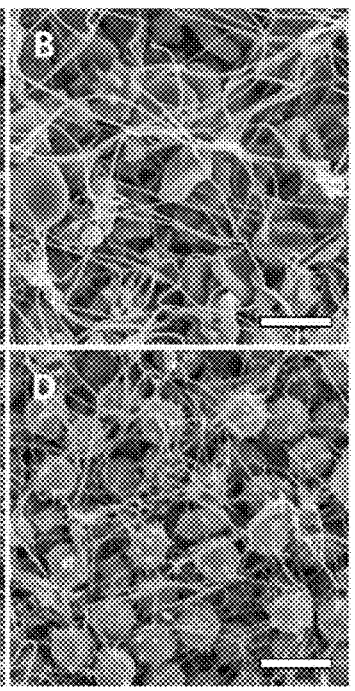
FIG. 4C  FIG. 4D

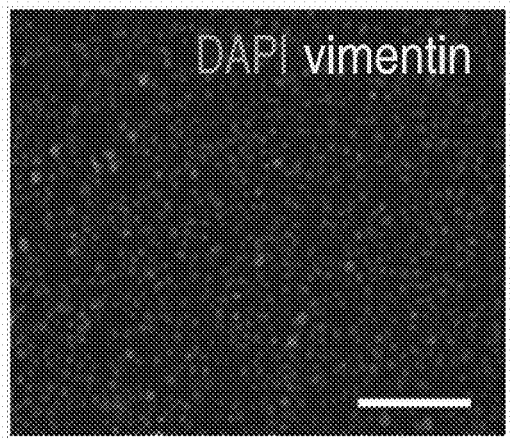 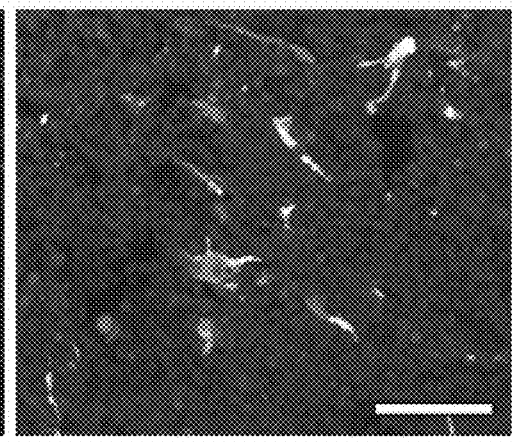
FIG. 5A    FIG. 5B
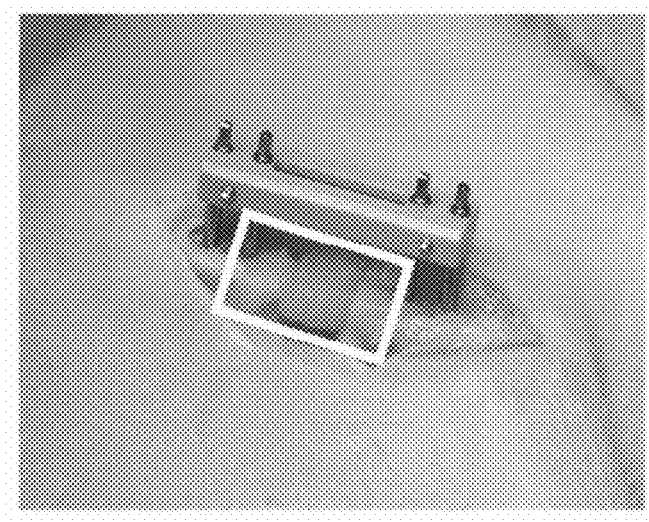
FIG. 6

COMPOSITIONS AND METHODS FOR TREATING BONE INJURY

CROSS-REFERENCE TO RELATED APPLICATIONS

This application is a national phase application under 35 U.S.C. § 371 of International Application No. PCT/US2019/051541, filed Sep. 17, 2019 and claims the benefit of the filing dates of U.S. Provisional Application No. 62/732,534, filed on Sep. 17, 2018; and U.S. Provisional Application No. 62/845,500, filed on May 9, 2019. The content of these earlier filed applications is hereby incorporated by reference in their entirety.

BACKGROUND

On average 7.9 million fractures occur annually in the U.S. alone, with approximately 5-10% resulting in delayed unions, non-unions, sub-critical size defects or large bone defects, creating significant therapeutic challenges for surgeons (Zura, et al., JAMA Surg. 2016 Nov. 16; 151). In the general population, fracture severity, anatomic location, patient comorbidities, smoking, and the use of certain medications can contribute substantially towards problems with fracture healing (Zura, et al., JAMA Surg. 2016 Nov. 16; 151). The cost of treatment of non-unions of the tibia, femur, or humerus ranges between $31,500 and $34,400 for each case, a substantial burden on health care costs annually (Kanakaris N K, Giannoudis P V. Injury. 2007; 38 Suppl 2: S77 S84; and Wu, et al Orthopedic Research and Reviews. 2013:5 21-33).

In addition, more than 59,000 military personnel have been wounded in combat related operations while serving in Iraq and Afghanistan, of which 50% were musculoskeletal injuries, including large segmental bone defects (Belmont Jr. P J, McCriskin B J, Sieg R N, Burks R, Schoenfeld A J. Combat wounds in Iraq and Afghanistan from 2005 to 2009. J Trauma Acute Care Surg. 2012; 73: 3-12). It has been estimated that 78% of musculoskeletal injuries sustained in these conflicts were major limb injuries (Stansbury L G, Lalliss S J, Branstetter J G, Bagg M R, Holcomb J B. Amputations in U.S. military personnel in the current conflicts in Afghanistan and Iraq. J Orthop Trauma. 2008; 22: 43-46). Such bone injuries heal poorly, specifically those related to high impact blast injuries due to contaminated bone and soft tissue destruction combined with locally decreased tissue vascularity. Even without such complications, bone defects beyond a critical size have no intrinsic ability to heal. The management of patients with large segmental bone defects is still one of the most challenging clinical problems faced by both military and civilian surgeons (Pollak A N, Ficke J R, Extremity War Injuries III Session Moderators. Extremity war injuries: challenges in definitive reconstruction. J Am Acad Orthop Surg. 2008; 16: 628-34). The importance of improving the ability of clinicians to successfully manage these injuries cannot be overemphasized, as these devastating injuries often result in a protracted course of continued medical care that is inevitably costly, with a significant risk of failure and eventual amputation. As a result of the military activity in Iraq and Afghanistan alone (OIF/OEF), more than two thousand soldiers have required at least one amputation (Fischer H A Guide to U.S. Military Casualty Statistics: Operation Freedom's Sentinel, Operation Inherent Resolve, Operation New Dawn, Operation Iraqi Freedom, and Operation Enduring Freedom. Congr Res Serv. 2015; 7). Furthermore, persistent non-healing bone defects are associated with a delayed return to work or military duties, with a corresponding reduction in the individual's quality of life. Therefore, there is clearly an unsatisfied clinical need, a powerful motivator towards development of more effective treatment strategies to address these potentially catastrophic injuries.

SUMMARY

Disclosed herein are ex vivo hematomas comprising: (a) isolated whole blood; (b) sodium citrate; and (c) ecarin; oscutarin and calcium chloride; calcium chloride; thrombin; or thrombin and calcium chloride; wherein the ex vivo hematoma comprises fibrin fibers having a thickness of at least 150-300 nm±10%.

Disclosed herein are ex vivo hematomas comprising: (a) platelet rich plasma, plasma, or plasma with red blood cells; and (b) ecarin; oscutarin and calcium chloride; calcium chloride; thrombin; or thrombin and calcium chloride; wherein the ex vivo hematoma comprises fibrin fibers having a thickness of at least 150-300 nm±10%.

Disclosed herein are methods of constructing an implant, the methods comprising: a) dimensioning a depot implant in at least one of a shape and a size that facilitates implantation of the depot implant into a bone defect; and b) structuring the depot implant to have a scaffold by introducing (i) isolated whole blood and sodium citrate; or platelet rich plasma, plasma, or plasma with red blood cells; and (ii) ecarin; oscutarin and calcium chloride; calcium chloride; thrombin; or thrombin and calcium chloride to create the scaffold; wherein the scaffold has a porosity of 55 to 75%.

Other features and advantages of the present compositions and methods are illustrated in the description below, the drawings, and the claims.

BRIEF DESCRIPTION OF THE DRAWINGS

FIGS. 3A-B show hematoma formation in femoral defects in rats 3 day after surgery, 0.5 mm (A) and 5 mm (B).

FIGS. 4-D show rat bloods clots; natural clot (A), low (B), medium (C), and high (D) concentrations of ecarin.

FIGS. 5A-B show stem cell survival in blood clots after addition of 0.5 U/mL of ecarin. FIG. 5A shows a clot without stem cells. FIG. 5B shows a clot with stem cells. Autofluorescent red blood cells (green), cell nuclei (blue), cytoskeleton of stem cells (red). Scale bar=50 μm.

FIG. 6 is an illustration of the rat femoral defect model. The white box indicates the 5 mm defect gap for the implantation of the ex vivo hematoma, platelet rich plasma (PRP) or BMP-2.

FIG. 14A shows whole blood (WB)+0.1 U/mL ecarin at 8 weeks. FIG. 14B shows platelet rich plasma (PRP)+calcium chloride at 8 weeks. FIG. 14C shows collagen scaffold+1.1 μg BMP-2 at 8 weeks. FIG. 14D shows whole blood+0.3 U/mL ecarin+1.1 μg BMP-2 at 8 weeks. FIG. 14E shows whole blood+0.3 U/mL ecarin+0.55 μg BMP-2 at 8 weeks. FIG. 14F shows whole blood+0.6 U/mL ecarin+0.55 μg BMP-2 at 4 weeks.

DETAILED DESCRIPTION

Figure 1:
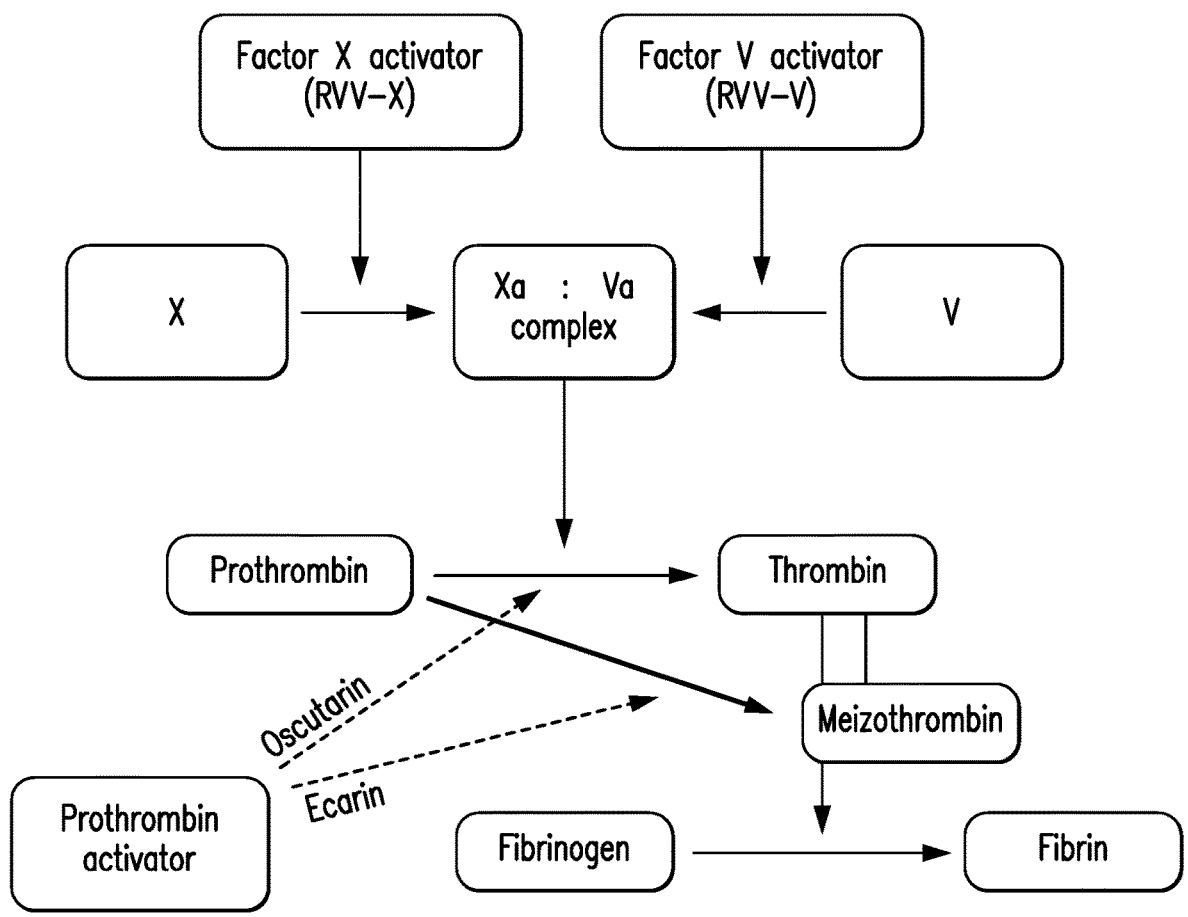
FIG. 1 is a schematic depicting the mechanism of prothrombotic agents from snake venoms on the mammalian coagulation cascade.
Figure 2:
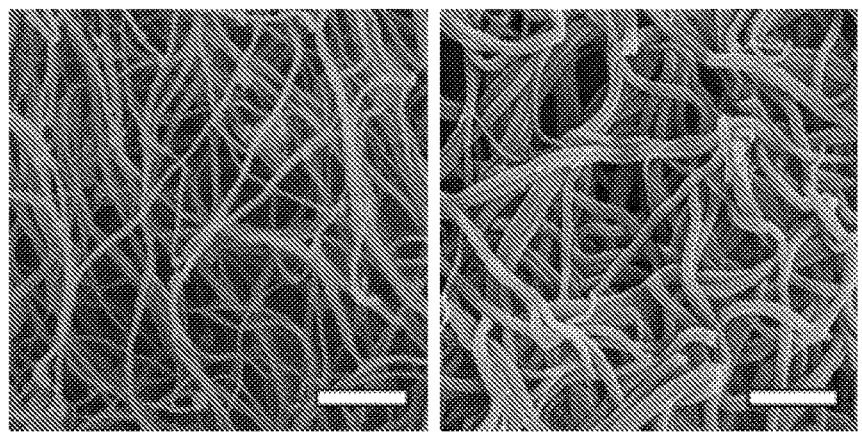
FIG. 2 shows scanning electron microscopy images of rat fracture hematomas: 0.5 mm (normally healing bone defect; left image) and 5 mm (segmental bone defect that would not heal spontaneously, and require an intervention from a surgeon; right image) bone defects. Scale=1 μm.

The present disclosure can be understood more readily by reference to the following detailed description of the invention, the figures and the examples included herein.

Before the present compositions and methods are disclosed and described, it is to be understood that they are not limited to specific synthetic methods unless otherwise specified, or to particular reagents unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including matters of logic with respect to arrangement of steps or operational flow, plain meaning derived from grammatical organization or punctuation, and the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

Definitions

As used in the specification and the appended claims, the singular forms "a," "an" and "the" include plural referents unless the context clearly dictates otherwise.

The word "or" as used herein means any one member of a particular list and also includes any combination of members of that list.

Throughout the description and claims of this specification, the word "comprise" and variations of the word, such as "comprising" and "comprises," means "including but not limited to," and is not intended to exclude, for example, other additives, components, integers or steps. In particular, in methods stated as comprising one or more steps or operations it is specifically contemplated that each step comprises what is listed (unless that step includes a limiting term such as "consisting of"), meaning that each step is not intended to exclude, for example, other additives, components, integers or steps that are not listed in the step.

Ranges can be expressed herein as from "about" or "approximately" one particular value, and/or to "about" or "approximately" another particular value. When such a range is expressed, a further aspect includes from the one particular value and/or to the other particular value. Similarly, when values are expressed as approximations, by use of the antecedent "about," or "approximately," it will be understood that the particular value forms a further aspect. It will be further understood that the endpoints of each of the ranges are significant both in relation to the other endpoint and independently of the other endpoint. It is also understood that there are a number of values disclosed herein and that each value is also herein disclosed as "about" that particular value in addition to the value itself. For example, if the value "10" is disclosed, then "about 10" is also disclosed. It is also understood that each unit between two particular units is also disclosed. For example, if 10 and 15 are disclosed, then 11, 12, 13, and 14 are also disclosed.

As used herein, the terms "optional" or "optionally" mean that the subsequently described event or circumstance may or may not occur and that the description includes instances where said event or circumstance occurs and instances where it does not.

As used herein, the term "subject" refers to the target of administration, e.g., a human. Thus, the subject of the disclosed methods can be a vertebrate, such as a mammal, a fish, a bird, a reptile, or an amphibian. The term "subject" also includes domesticated animals (e.g., cats, dogs, etc.), livestock (e.g., cattle, horses, pigs, sheep, goats, etc.), and laboratory animals (e.g., mouse, rabbit, rat, guinea pig, fruit fly, etc.). In one aspect, a subject is a mammal. In another aspect, the subject is a human. The term does not denote a particular age or sex. Thus, adult, child, adolescent and newborn subjects, as well as fetuses, whether male or female, are intended to be covered.

As used herein, the term "patient" refers to a subject afflicted with a disease or disorder or condition. The term "patient" includes human and veterinary subjects. In some aspects of the disclosed methods, the "patient" has been diagnosed with a need for treatment for healing of bone injuries, such as, for example, prior to the administering step.

As used herein, the term "treating" refers to partially or completely alleviating, ameliorating, relieving, delaying onset of, inhibiting or slowing progression of, reducing severity of, and/or reducing incidence of one or more symptoms or features of a particular disease, disorder, and/or condition. Treatment can be administered to a subject who does not exhibit signs of a disease, disorder, and/or condition and/or to a subject who exhibits only early signs of a disease, disorder, and/or condition for the purpose of decreasing the risk of developing pathology associated with the disease, disorder, and/or condition. For example, the disease, disorder, and/or condition can be a bone injury or bone fracture.

Current methods of treating large segmental bone defects. Many techniques have been employed for the treatment of skeletal defects, including autologous bone grafts, various bone graft substitutes, Ilizarov methods, arthroplasty with mega-prostheses, biologics, and as a last resort, amputation. However, these existing treatment options characteristically require prolonged treatment involving multiple surgeries, are expensive, have high complication rates, and are associated with a significant risk of treatment failure. For example, autografting remains the treatment of choice when healing large segmental bone defects (Khan S N, Cammisa F P, Sandhu H S, Diwan A D, Girardi F P, Lane J M. J Am Acad Orthop Surg. 2005; 13: 77-86). However, the supply of sufficient autograft material can be limited, especially in the case of severe traumatic injury or nonunion of fracture in a civilian population and severely injured soldiers, and is associated with significant morbidity at the donor site. In contrast, although allograft bone is available in large quantities, its use raises concerns about disease transmission and the immune response (Khan S N, Cammisa F P, Sandhu H S, Diwan A D, Girardi F P, Lane J M. J Am Acad Orthop Surg. 2005; 13: 77-86), but more importantly, it consists of dead bone that does not resorb or remodel well. It has also been shown to gradually accumulate micro-fractures when loaded, leading to a 5-year failure rate of 30% or greater (Enneking W F, Campanacci D A. J Bone Joint Surg Am. 2001; 83-A: 971-986; and Wheeler D L, Haynie J L, Berrey H, Scarborough M, Enneking W. Biomed Sci Instrum. 2001; 37: 251-256). Additionally, various bone substitutes have also been developed to aid in the therapy of large segmental bone defects, yet these approaches are limited to marginal improvement in outcomes. Inadequate bone formation, poor mechanical and handling properties, a lack of biocompatibility, unpredictable resorption, and associated inflammatory reactions remain major limitations for such materials (McKee M D. J Am Acad Orthop Surg. 2006; 14: S163-7). For this reason, distraction osteogenesis remains the treatment of choice by military surgeons for bone defects that exceed 8 cm. This technique is, however, cumbersome, painful and unreliable, complicated by pin track infections, and can be slow to heal (Pollak A N, Ficke J R, J Am Acad Orthop Surg. 2008; 16: 628-34). Above all, the main complication of the available therapeutic options for large segmental bone defects is their inability to ensure a quick restoration of function, and the ability to reduce the rate of refracture.

Studies into the biology of osteogenesis has led to the discovery of bone morphogenetic proteins (BMPs), which are some of the most potent inducers of osteogenesis (Urist M R. J Bone Miner Res. 1997; 12: 343-6). Two members of the BMP family have been approved for clinical use: recombinant human BMP-2 (rhBMP-2; INFUSE®) and recombinant human BMP-7 (rhBMP-7; OP-1®). Although BMPs have shown preclinical efficacy in animal models, their clinical effectiveness has been disappointing. The modest clinical response to these proteins has been associated with delivery problems. Furthermore, the current practice of using extremely high supra-physiological doses of BMPs, most of which rapidly leaches away from the site of application, has the potential to increase the incidence and severity of ectopic/heterotopic ossification and many other related side effects, such as antibody formation, implant dislodgment, bone resorption and even cancer (Carragee E J, Hurwitz E L, Weiner B K. Spine J. 2011; 11: 471-491). Therefore, a suitable carrier needs to be developed to improve the effectiveness of BMPs by significantly minimizing the dose required, thus limiting their potential side effects and associated treatment costs.

In recent years, platelet-rich plasma (PRP), blood plasma enriched with a high concentration of platelets, has been trialed across a range of applications, including the treatment of musculoskeletal injuries. PRP is thought to secrete a variety of growth factors and cytokines at supra-physiologic concentrations and generates a cell-supporting matrix in the form of a fibrin clot. Specifically, it has been suggested that the effects of PRP to promote bone healing (Iqbal J, Pepkowitz S H, Klapper E. Curr Osteoporos Rep. 2011; 9: 258-263; and Kurikchy M Q, Al-Rawi N H, Ayoub R S, Mohammed S S. Clin Oral Investig. 2013; 17: 897-904) are due to an increased concentration of factors such as platelet-derived growth factor (PDGF), transforming growth factor beta (TGF-β), bone morphogenetic proteins (BMPs) and insulin-like growth factor 1 (IGF-1) (Soffer E, Ouhayoun J P, Anagnostou F. Oral Surgery, Oral Medicine, Oral Pathology, Oral Radiology, and Endodontics. 2003. pp. 521-528). Nevertheless, the results from experimental (Simman R, Hoffmann A, Bohinc R J, Peterson W C, Russ A J. Ann Plast Surg. 2008; 61: 337-44) and clinical studies (Marx R E, Carlson E R, Eichstaedt R M, Schimmele S R, Strauss J E, Georgeff K R. Oral Surg Oral Med Oral Pathol Oral Radiol Endod. 1998; 85: 638-46) using PRPs in oral and maxillo-facial bone grafting procedures are controversial, and to date there is little evidence to suggest it actually improves or accelerates bone healing, in fact, in the majority of cases there was a decrease in bone formation (Choi B-H, Im C-J, Huh J-Y, Suh J-J, Lee S-H. Int J Oral Maxillofac Surg. 2004; 33: 56-9; and Marden L J, Fan R S P, Pierce G F, Reddi A H, Hollinger J O. J Clin Invest. 1993; 92: 2897-2905). This apparent lack of efficacy also extends to long bones and spine. A recent study in sheep, using an osteotomy of the femoral diaphysis followed by distraction osteogenesis, failed to show that the application of PRP improved new bone formation (Hernandez-Fernandez A, Velez R, Soldado F, Saenz-Rios J C, Barber I, Aguirre-Canyadell M. Injury. 2013; 44: 901-7). Likewise, in rodent studies, PRPs have no beneficial effect on bone healing (Pryor M E, Yang J, Polimeni G, Koo K, Hartman M J, Gross H, et al. J Periodontol. 2005; 76: 1287-1292; and Ranly D M, Lohmann C H, Andreacchio D, Boyan B D, Schwartz Z. J Bone Joint Surg Am. 2007; 89: 139-147) or, at best, indicated a low regenerative potential (Sanchez A R, Sheridan P J, Eckert S E, Weaver A L. J Periodontol. 2005; 76: 1637-1644). In studies to encourage bone healing after spinal fusion there were also no benefits in either animals (Li H, Zou X, Xue Q, Egund N, Lind M, Bünger C. Eur Spine J. 2004; 13: 354-8) or human subjects (Weiner B K, Walker M. Spine (Phila Pa. 1976). 2003; 28: 1968-1970). The factors responsible for the variable outcomes in these studies are not known, but it has been suggested that proteases present in the platelets may degrade the growth factors (Thibault L, Beauséjour A, De Grandmont M J, Lemieux R, Leblanc J F. Transfusion. 2006; 46: 1292-1299) thereby changing the composition of the PRP and reducing its experimental and clinical effectiveness. Furthermore, PRP activation requires thrombin that leads to a burst release of growth factors, and a reduction of total growth factor concentrations. Bovine thrombin interferes with human coagulation proteins by stimulating antibodies against thrombin, which is thought to affect the healing process (Oryan A, Alidadi S, Moshiri Expert Opin Biol Ther. 2016; 16: 213-32). This may be also related to the inability of PRP to form a clot with suitable structural properties.

Based on the poor performance of PRPs, a "second generation" of platelet concentrate was developed by the French maxillofacial surgeon Joseph Choukroun called platelet-rich fibrin (PRF) (Choukroun J, Diss A, Simonpieri A, Girard M-O, Schoeffler C, Dohan S L, et al. Oral Surg Oral Med Oral Pathol Oral Radiol Endod. 2006; 101: 299-303). It was described as a more natural fibrin matrix containing the constituents of blood that are favorable to healing and immunity, with specific advantages over PRPs. For example, the clotting process takes place by a slower natural polymerization compared to the fast polymerization resulting when thrombin is added to PRPs. Most importantly, PRFs do not require anticoagulants or thrombin additives (Dohan D M, Choukroun J, Diss A, Dohan S L, Dohan A J J, Mouhyi J, et al. Oral Surgery, Oral Med Oral Pathol Oral Radiol Endodontology. 2006; 101). In vitro studies have also shown that PRFs have a more sustained release of growth factors such as PDGF, TGF-β, and BMPs, lasting up to 28 days (He L, Lin Y, Hu X, Zhang Y, Wu H. Oral Surgery, Oral Med Oral Pathol Oral Radiol Endodontology. 2009; 108: 707-713). This release profile is significantly different to PRPs, which are characterized by a burst release of cytokines and growth factors within one day. Despite that, PRFs have not shown any significant improvements when applied in oral and maxillofacial surgery (Choukroun J, Diss A, Simonpieri A, Girard M-O, Schoeffler C, Dohan S L, et al. Oral Surg Oral Med Oral Pathol Oral Radiol Endod. 2006; 101: 299-303; and Busenlechner D, Huber C D, Vasak C, Dobsak A, Gruber R, Watzek G. Clin Oral Implants Res. 2009; 20: 1078-1083). Again, this could be related to an insufficient amount of platelets delivered, along with unsuitable structural properties, similar to PRPs.

The influence of hematoma formation on bone fracture healing. Fracture hematoma formation occurs within minutes of a bone injury and includes a cascade of biological events that engage activated coagulation factors from the hematological system as well as a number of molecular factors derived from the periosteum, bone marrow, and surrounding soft tissues, such as pro-inflammatory cytokines and growth factors, including osteogenic and angiogenic factors (Lai B F L, Zou Y, Brooks D E, Kizhakkedathu J N. Biomaterials. Elsevier Ltd; 2010; 31: 5749-5758). At a fracture site, blood vessels contract to prevent sustained blood loss, followed by a coagulation cascade that leads to the formation of a hematoma, or blood clot, situated between the broken fragments (Schindeler A, McDonald M M, Bokko P, Little D G. Semin Cell Dev Biol. 2008; 19: 459-66). In the clotting process, there are two main pathways: intrinsic and extrinsic, in which the common pathway is the conversion of coagulation factor X into Xa. Thrombin, the final protease in the coagulation cascade, is a typical serine protease of the chymotrypsin family and has both pro- and anti-coagulant functions (Huntington J A. Thrombin plasticity. Biochim Biophys Acta—Proteins Proteomics. Elsevier B. V.; 2012; 1824: 246-252). During normal blood coagulation, a coagulation cascade activates the zymogen prothrombin by converting it into the serine protease thrombin. Thrombin then converts the soluble fibrinogen into insoluble fibrin fibers. Finally, these fibrin fibers contribute to the formation of a mature web-like fibrin clot with the assistance of coagulation factor XIII (Chernysh I N, Nagaswami C, Purohit P K, Weisel J W. Sci Rep. 2012; 2: 879). Thus, the concentration gradients of fibrinogen, thrombin, and coagulation factor XIII play an important role in modulating fibrin clot conformation (Wolberg A S, Campbell R A. Transfus Apher Sci. 2008; 38: 15-23). The structural parameters in fibrin clots can be characterized by the fiber diameter, density, the number of branch points, distances between branch points, and dimension of the pores (Weisel J W, Litvinov R I. Blood. 2013; 121: 1712-1719). The rise in diameter of fibrin fiber is inversely proportional to the density of the fibrin fiber and directly proportional to pore size (Eichhorn S J, Sampson W W. J R Soc Interface. 2005; 2: 309-318; and Kaur S, Sundarrajan S, Rana D, Matsuura T, Ramakrishna S. J Memb Sci. 2012; 392-393: 101-111). In addition, the diameter and density of fibers has an impact on the porosity and surface area of fibrin clots (Pham Q P, Sharma U, Antonios G. Mikos. Biomacromolecules. 2006; 7: 2796-2805) and is responsible for the biological functions of stem cells, such as adhesion, proliferation, and differentiation (Badami A S, Kreke M R, Thompson M S, Riffle J S, Goldstein A S. Biomaterials. 2006; 27: 596-606). For example, low thrombin concentrations (<1 nM) generate a porous network of thick fibrin fibers highly susceptible to fibrinolysis, whereas high concentrations of thrombin result in thin fibers that form a poorly permeable fibrin network relatively resistant to fibrinolysis (Gabriel D A, Muga K, Boothroyd E M. J Biol Chem. 1992; 267: 24259-63). Moreover, although an individual thick fiber has a higher mechanical strength (stiffness), a fibrin clot composed of thick fibers often has lower mechanical strength as a result of a reduced number of fibers (Carlisle C R, Coulais C, Guthold M. Acta Biomater. 2010; 6: 2997-3003; and Liu W, Thomopoulos S, Xia Y. Adv Healthc Mater. 2012; 1: 10-25).

Despite the large body of research on the importance of hematoma formation in fracture healing, there are no studies that reported the differences between the structural and biological properties of hematomas formed between the healing of fractures, which normally heal by themselves, and segmental bone defects, which do not, and whether hematoma properties can be modulated to enhance the repair of large segmental bone defects.

Instead, it appears that most studies have been focusing on refining the properties of PRP, as is evident with the "second generation" product PRF. Even though some studies do suggest that PRF is a somewhat more effective product compared to its counterpart PRP, the studies to date are not convincing and require further investigation, specifically in relation to the repair and regeneration of long bones.

Disclosed herein are methods to improve the structural and biological properties of an induced blood clot in order to enhance the healing of large segmental bone defects. For example, to considerably improve and accelerate the healing of large segmental bone defects in soldiers and civilians, described herein are ex vivo hematomas which are created by constructing a fibrin clot that mimics the structural properties of innate fracture hematoma. To this end, a rat model was used to assess whether the quality of the hematoma that forms at a fracture site determines the healing potential of large bone defects; and if whole blood can be manipulated using a snake venom enzyme to form a blood clot that mimics the intrinsic structural properties of normal fracture hematoma, and then used to enhance the healing of large bone defects.

Prothrombotic snake venoms. A number of snake venom toxins contain proteolytic enzymes that affect hemostasis by the action of coagulant thrombin-like enzymes and prothrombin activating toxins (FIG. 1). As shown in FIG. 1, the conversion of factor X to (activated) Xa is the common junction between the extrinsic and intrinsic coagulation pathways. Snake venom enzymes have evolved to exploit the various phases of the coagulation cascade. These venoms have evolved to exploit the vulnerable interaction that exists between platelets, endothelial cells and plasma proteins with venom proteins that have an effect on phases of vertebrate hemostasis (Meier J, Stocker K. Crit Rev Toxicol. 1991; 21: 171-182). Depending on the type of snake, they each have specific pro-coagulating factors. For example, the pro-coagulating factor oscutarin found in the venom of the coastal taipan (*Oxyuranus scutellatus*) is structurally and functionally similar to mammalian coagulation factor X. Oscutarin is a serine protease that belongs to the group C prothrombin activator venoms which, unlike mammalian factor X, does not require the non-enzymatic factor V, since they contain their own factor Va-like molecule (St. Pierre L, Masci P P, Filippovich I, Sorokina N, Marsh N, Miller D J, et al. Comparative analysis of prothrombin activators from the venom of Australian elapids. Mol Biol Evol. 2005; 22: 1853-1864). Similarly, ecarin, found in the venom of the Saw-scaled viper (*Echis carinatus*) is a metalloproteinase that acts without the involvement of co-factors such as calcium chloride ($CaCl_2$) and phospholipids. The lack of co-factor requirement allows ecarin to convert both carboxylated and descarboxylated prothrombin into meizothrombin (Hutton R. Blood Rev. 1993; 7: 176-189). Meizothrombin is an intermediate product of thrombin generation during whole blood clotting and is reported to have limited enzymatic activity in the conversion of fibrinogen to fibrin (Bovill E G, Tracy R P, Hayes T E, Jenny R J, Bhushan F H, Mann K G. Arterioscler Thromb Vasc Biol. 1995; 15: 754-758; and Krishnaswamy S, Mann K G, Nesheim M E. J Biol Chem. 1986; 261: 8977-8984). On the other hand, a serine protease RVV-V isolated from Russell's viper (*Dabioa russelli*) venom specifically activates factor V in a calcium-independent manner. Another well-characterized protease RVV-X, also isolated from Russell's viper venom, is a potent and specific activator of factor X. In contrast to RVV-V, the RVV-X is a metalloproteinase that requires $Ca^{2+}$ but not phospholipids as a co-factor (Takeya H, Nishida S, Miyata T, Kawada S I, Saisaka Y, Morita T, et al. J Biol Chem. 1992; 267: 14109-14117; and Tokunaga F, Nagasawaq K, Miyataq T, Iwanagaqll S. J Biol Chem. 1988; 263: 17471-17481). Comparatively, in a normal fracture site, factor X binds to factor V on the platelet membrane, which accelerates the generation of thrombin many thousand-fold—a mechanism that leads to the formation of a mature clot that stabilizes the primary hemostatic plug (Probst A, Spiegel H-U. J Investig Surg. 1997; 10: 77-86). The aforementioned suggests that pro-coagulating factors isolated from snake venoms should be suitable as a more natural clotting agent to alter the structural properties of blood clots. In fact, snake venom proteins have been important in elucidating the complex physiological mechanisms that govern the coagulation cascade and determine platelet function. Moreover, they have been instrumental in unraveling the structural and functional relationships of human clotting factors and platelet glycoproteins, because of their potency, selectivity, and high biological efficacy (Hong T-T, Huang J, Lucchesi B R. Am J Physiol Heart Circ Physiol. 2006; 290: H959-67; Han S M, Weaver F A, Comerota A J, Perler B A, Joing M. J Vasc Surg. 2010; 51: 600-9; Sanchez E F, Bush L R, Swenson S, Markland F S. Thromb Res. 1997; 87: 289-302; Swenson S, Bush L R, Markland F S. Arch Biochem Biophys. 2000; 384: 227-37; and Shah A R, Scher L. Drugs. 2007; 10: 329-35). As a result, several active venom compounds have been identified, isolated, characterized and purified, and are currently used for both diagnostic and medicinal purposes (King G F. Expert Opin Biol Ther. 2011; 11:1469-84; and Butler M S. Nat Prod Rep. 2008; 25: 475-516). As described herein, are compositions comprising snake venom coagulating enzymes (SVCE) as an alternative clotting agent, as opposed to the addition of thrombin, which has been shown to have side effects when used clinically (Oryan A, Alidadi S, Moshiri A. Expert Opin Biol Ther. 2016; 16: 213-32). Specific SVCEs have been shown to be catalytically more active than their mammalian counterparts, and are known to be more heat stable and more resistant to proteolysis due to the presence of additional disulfide bridges (Kang T S, Georgieva D, Genov N, Murakami M T, Sinha M, Kumar R P, et al. FEBS J. 2011; 278: 4544-76). Disclosed herein are compositions and methods demonstrating the ability of snake venom enzymes to alter the properties of hematoma, and their ability to heal large segmental defects using a rat model. Disclosed herein are compositions and methods for altering the properties of hematoma comprising administering one or more of the compositions disclosed herein.

The coagulating factors from snake venoms were favored for several reasons, for instance, they do not affect other clotting factors, and the molecule's small size makes it less likely to be recognized by the body's immune system when used, and are therefore less likely to be attacked. Additionally, the molecules are selective when attaching to their targets within the body, which minimizes the potential for unwanted side effects. Ecarin was specifically selected because it does not require co-factors for activation.

This disclosure is important for the development of new and improved treatment strategies to enhance the healing of bone injuries, increase quality of life, reduce high treatment costs, and decrease the rate of limb amputations, both in the in civilian population as well as amongst military personnel, as a result of severe trauma and battlefield injuries. The results disclosed herein can provide the requirements for an ex vivo produced hematoma with properties that increase the effectiveness of bone healing by mimicking the intrinsic structural and biological properties of naturally healing fracture hematoma. This disclosure is also important for the development of an ex vivo hematoma that acts as a growth factor reservoir, is osteoinductive and osteoconductive, as well as serves as a biocompatible scaffold, to enhance the healing of large segmental bone defects, sub-critical size defects as well as for treatment of non-healing fractures (delayed unions or non-unions).

Rapid product translation can be expected, as well as an on-demand application, by simply mixing the required volume of whole blood with a specific concentration of the snake venom coagulating enzyme in the operating room, without highly specialized equipment in a civilian or military clinical setting. The results described here can also benefit biomaterials researchers, by incorporating conformed structural properties of hematoma into the design of biomaterial scaffolds to improve the capability of the poorly performing scaffolds currently used in regenerative medicine to aid in bone repair. Furthermore, pro-coagulating factors isolated from snake venom might be used as a suitable clotting agent to alter the structural properties of blood clots as well as be used to stop uncontrolled bleeding in a hospital setting and on the battlefield. Also disclosed herein is a product that could stop bleeding within seconds that is easy to carry, has a long shelf life, is resorbable or easy to remove, and is inexpensive. Because these snakes evolved to kill their prey by causing instant, massive coagulopathy, they have developed highly specific biological agents that turn blood into gelatin. However, when properly isolated and carefully prepared under controlled conditions, the same coagulating factors, such as ecarin, can instead be used to help save lives. By immediately controlling blood loss, this remarkable property can limit further blood loss in either civilian patients or wounded soldiers on the battlefield.

Disclosed herein are biocompatible snake venom-induced ex vivo hematomas for healing large bone defects. Also disclosed herein are methods for processing and manipulating ex vivo hematomas (blood clots) in specific ways that modifies its ultrastructural characteristics, thereby altering its behavior in various clinical situations. Disclosed herein are methods of treating whole blood or blood products with an agent that alters its structural conformation and changes its biological activity so that it can be used for the treatment of several different medical conditions.

Disclosed herein are compositions and methods that can be used to improve the regeneration and repair of large bone defects, sub-critical size defects as well as for the treatment of non-healing fractures (delayed unions or non-unions). Disclosed herein are organized blood clots (ex vivo hematomas/biocompatible scaffold) that can be used to enhance bone healing by serving as a temporary reservoir for the continuous release of important growth factors, and by providing adequate space will simultaneously assist with cell infiltration, proliferation, and differentiation. Disclosed herein are compositions and methods for enhancing the repair process that involves producing a blood clot (ex vivo hematoma) that mimics a naturally healing fracture hematoma. The concept is that the structural properties of an ex vivo product, the hematoma, can be altered using a coagulating factor derived from snake venom, ecarin, to mimic an intrinsic fracture hematoma which, when implanted into a bone defect, will enhance and accelerate bone healing. A coagulating factor derived from snake venom, ecarin, can also be used to stop bleeding. In some aspects, the composition can be formulated as a powder, liquid or spray.

Disclosed herein are compositions comprising whole blood, ecarin and BMP-2. In some aspects, ecarin can be present at a specific concentration. In some aspects, a low or markedly reduced dose of BMP-2 can be used. In some aspects, said composition can be used to enhance bone defect healing. In some aspects, the composition can be formulated as a liquid or a gel.

The type of healing described herein is similar to the healing provided by a commercially available product sold by Medtronic, which uses rhBMP-2 delivered on am absorbable collagen sponge (Infuse™). The composition or product described herein requires a significantly lower dose of BMP-2 (e.g., rhBMP-2) to initiate bone healing. In some aspects, the dose of BMP-2 can be 1, 2, 3, 4, 5, 6, 7, 8, 9, 10, 15, 20 or more times lower than any commercially available product or compositions.

As disclosed herein, BMP-2 belongs to a family of bone morphogenetic proteins (BMPs). These proteins are bone growth factors with the ability to induce endochondral bone neoformation. In some aspects, BMP-2 can be recombinant BMP-2. Methods of producing recombinant BMP-2 are known in the art, and for example, can be found in U.S. Pat. No. 7,354,901 which is hereby incorporated by reference herein.

Compositions

Disclosed herein are ex vivo hematomas. In some aspects, the ex vivo hematomas can comprise: (a) isolated whole blood; (b) sodium citrate; and (c) ecarin; oscutarin and calcium chloride; calcium chloride; thrombin; or thrombin and calcium chloride. In some aspects, the ex vivo hematomas can comprise: (a) platelet rich plasma, plasma, or plasma with red blood cells; and (b) ecarin; oscutarin and calcium chloride; calcium chloride; thrombin; or thrombin and calcium chloride. In some aspects, the ex vivo hematoma can further comprise sodium citrate. In some aspects, the phrase "plasma with red blood cells" means plasma without platelets. In some aspects, the ex vivo hematomas can comprise fibrin fibers having a thickness of at least 150-300 nm±10%. In some aspects, the ecarin; oscutarin and calcium chloride; calcium chloride; thrombin; or thrombin and calcium chloride can result in the formation of one or more fibrin fibers having a thickness of at least 150-300 nm±10%. The term "ex vivo" as used herein refers to a hematoma that can be formed outside of an organism, for example, in an external environment. In some aspects, the ex vivo hematoma can comprise (a) isolated whole blood and sodium citrate platelet rich plasma, plasma alone, plasma with red blood cells (without platelets) or other blood products; and (b) one or more coagulating factors. In some aspects, the ex vivo hematomas can comprise whole blood and one or more coagulating factors.

As used herein, the terms "whole blood" and "blood" are used here to mean blood that can be drawn directly from the body from which none of the components, including plasma or platelets, have been removed. In some aspects, the whole blood or blood can be from the subject or patient that will be the receipt of any of the compositions described herein or any of the ex vivo hematomas described herein. In some aspects, the whole blood or blood can be from a donor subject or patient. Whole blood is made up of red blood cells, white blood cells, platelets and plasma. In some aspects, a fibrin gel can be used in place of whole blood.

One of ordinary skill in the art will appreciate that blood is a specialized body fluid that delivers important substances such as nutrients and oxygen to the cells and transports metabolic waste products away from those same cells. In vertebrates, blood is composed of blood cells suspended in blood plasma. Blood can comprise different components, for example, plasma, red blood cells (erythrocytes), platelets (thrombocytes) and white blood cells (leukocytes). Plasma is the main component, making up about 55%, of blood, consisting of mostly water with ions, proteins, nutrients and wastes. Plasma can contain some of every protein produced by the body. For example, plasma can comprise about 90% water and 10% of a mix of the following: ions ($Na^+$, $K^+$, $Mg^{+2}$, $Ca^{+2}$, $Cl^-$, $HCO_3^-$, $HPO_4^{-2}$, $SO_4^{-2}$) (Nezafati et al., 2012); proteins (e.g., mainly albumin-55%, globulin, growth factors, enzymes, hormones, antibodies); clotting factors (Factors I-XIII) (labtestsonline.org.au); sugars (glucose); lipids (cholesterols); minerals (sodium, calcium, magnesium, potassium, iron, zinc, copper, and selenium) (Harrington et al., 2014); waste products; and dissolved gases. Red blood cells (erythrocytes) are responsible for carrying oxygen and carbon dioxide. They are about 7-8 μm in size, contain no mitochondria or nucleus when mature, and have an average life span of 120 days. Women have about 3.6-5.0 million/mm$^3$ red blood cells, and men have about 4.2-5.4 million/mm$^3$ red blood cells. Platelets (thrombocytes) are responsible for blood clotting. A normal platelet count ranges from about 150,000 to 450,000/mm$^3$. White blood cells (WBCs; leukocytes) are part of the immune system and function in immune responses. About 1% of the cells are found in blood. They are larger in size than red blood cells, and contain a normal nucleus and mitochondria. A normal white blood cell count ranges from about 5,000-10,000/mm$^3$. White blood cells can be divided into 5 major types that are further divided into two different groups: Granulocytes: Neutrophils: 60-70% of WBCs or 3,000-7,000/mm$^3$, Eosinophils: 1-3% of WBCs or 50-400/mm$^3$, and Basophils: 0.3-0.5% of WBCs or 25-200/mm$^3$; and Agranulocytes: Lymphocytes: 20-30% of WBCs or 1,000-4,000/mm$^3$, and Monocytes: 3-8% of WBCs or 100-600/mm$^3$.

As used herein, the term "platelet rich plasma" (also known as autologous conditioned plasma) refers to a concentrated form of platelet rich plasma protein that is derived from whole blood. For example, whole blood can be centrifuged to remove red blood cells. In some aspects, the term "blood plasma alone", "plasma alone" or "plasma" can refer to a yellowish liquid component derived from whole blood that normally holds blood cells in whole blood in suspension. For example, blood plasma can be separated from whole blood by centrifuging blood until the blood cells fall to the bottom of the tube, and then the plasma can be drawn off from the top of the tube. In some aspects, the term "plasma with red blood cells" can refer to "plasma alone" with added red blood cells. For example, red blood cells can be derived by centrifuging whole blood until they fall to the bottom of the tube, and are retrieved after removing plasma, white blood cell and platelets from the top of the tube.

In some aspects, the ex vivo hematoma can comprise one or more growth factors. In some aspects, the one or more growth factors can be one or more of the bone morphogenetic proteins. Examples of BMPs include but are not limited to BMP-2, BMP-7, BMP-4, BMP-6, BMP-9, and BMP-14 (also known as GDF5). Any BMPs are contemplated, including BMP-1 through BMP-18. In some aspects, the one or more growth factors can be platelet-derived growth factor. In some aspects, the one or more growth factors can be vascular endothelial growth factor. In some aspects, the one or more growth factors can be fibroblast growth factor 2. In some aspects, the one or more growth factors can be one or more of the bone morphogenetic proteins, platelet-derived growth factor, vascular endothelial growth factor, fibroblast growth factor 2, or a combination thereof. In some aspects, the ex vivo hematoma can further comprise BMP-2. In some aspects, the one or more growth factors can be BMP-2.

In some aspects, the whole blood can comprise viable cells. In some aspects, about 50% to 70% of the viable cells of the whole blood remain viable after formation of the hematoma. In some aspects, at least 50% of the viable cells of the whole blood remain viable after formation of the hematoma. In some aspects, at least 60% of the viable cells of the whole blood remain viable after formation of the hematoma. In some aspects, at least 70% of the viable cells of the whole blood remain viable after formation of the hematoma. In some aspects, at least 80% of the viable cells of the whole blood remain viable after formation of the hematoma. In some aspects, at least 90% of the viable cells of the whole blood remain viable after formation of the hematoma. In some aspects, more than 90% of the viable cells of the whole blood remain viable after formation of the hematoma.

In some aspects, the whole blood can comprise one or more biological factors. In some aspects, the term "biological factors" or "other biological factors" refers to the plasma component of whole blood excluding water. Examples of other biological factors include but are not limited to ions, proteins, clotting factors, sugars, lipids, and minerals.

In some aspects, the one or more biological factors present in the whole blood can be endogenous biological factors. Platelets are present in whole blood. Many growth factors can be found in platelets. Growth factors in platelet-rich plasma platelet α-granules have been shown to contain mitogenic and chemotactic growth factors along with associated healing molecules in an inactive form, which are important in wound healing, including but not limited to platelet-derived growth factor (PDGF), transforming growth factors β1, β2, β3 (TGF-β1, TGF-β2, TGF-β3, platelet-derived angiogenesis factor (PDAF), insulin-like growth factor 1 (IGF-1), platelet factor 4 (PF-4), epidermal growth factor (EGF), epithelial cell grow factor (ECGF), vascular endothelial cell growth factor (VEGF), basic fibroblast growth factor (bFGF) and other cytokines. Additionally, plasma fluid also contains a number of biologically active proteins such as growth factor IGF-I and hepatocyte growth factor (HGF). During normal wound healing, trapped platelets become activated and degranulate, resulting in the release of the α-granule content. Examples of growth factors present in platelets include but are not limited to platelet-derived growth factors, transforming growth factors β1, (β2, β3, platelet-derived angiogenesis factor, insulin-like growth factor 1, platelet factor 4, epidermal growth factor, epithelial cell growth factor, vascular endothelial cell growth factor, basic fibroblast growth factor, and others cytokines; as well as platelet-derived endothelial growth factor (PDEGF), interleukin 1, osteocalcin and osteonectin. Growth factors present in plasma fluid include but are not limited to insulin-like growth factor 1, and hepatocyte growth factor.

In some aspects, the ex vivo hematoma can comprise whole blood, ecarin and sodium citrate. In some aspects, the ex vivo hematoma can comprise whole blood, calcium chloride and sodium citrate. In some aspects, the ex vivo hematoma can comprise platelet rich plasma and ecarin. In some aspects, the ex vivo hematoma can comprise platelet rich plasma and calcium chloride. In some aspects, the ex vivo hematoma can comprise whole blood; calcium chloride; or oscutarin and calcium chloride; and sodium citrate. In some aspects, a combination of one of (a) isolated whole blood and sodium citrate; platelet rich plasma, or plasma with red blood cells can be combined with one of (b) ecarin, oscutarin and calcium chloride, or calcium chloride. In some aspects, a combination of one of (a) isolated whole blood and sodium citrate; platelet rich plasma, or plasma with red blood cells can be combined with one of (b) thrombin or thrombin and calcium chloride. In some aspects, any of the ex vivo hematoma combinations described herein can further comprise one or more antibiotics.

In some aspects, the concentration of calcium chloride present in the ex vivo hematoma can be in the range of 1 mM to 20 mM. In some aspects, the concentration of calcium chloride can be 1, 2, 3, 4, 5, 6, 7, 8, 9, 10, 11, 12, 13, 14, 15, 16, 17, 18, 19, 20 mM or any number in between. In some aspects, the concentration of calcium chloride can be about 10 mM.

In some aspects, the concentration of thrombin can be in the range of 0.1 to 1 U/mL. In some aspects, the concentration of thrombin present in the ex vivo hematoma can be 0.05, 0.1, 0.2, 0.3, 0.4, 0.5, 0.6, 0.7, 0.8, 0.9, 1 U/mL or any number in between or higher. In some aspects, the concentration of thrombin present in the ex vivo hematoma can be 0.5 U/mL In some aspects, the concentration of ecarin present in the ex vivo hematoma can be at least 0.05 U/mL. In some aspects, the concentration of ecarin present in the ex vivo hematoma can be 0.05, 0.1, 0.2, 0.3, 0.4, 0.5, 0.6, 0.7, 0.8, 0.9, 1 U/mL or any number in between or higher. In some aspects, the concentration of ecarin present in the ex vivo hematoma can be 0.3 U/mL. In some aspects, the concentration of ecarin present in the ex vivo hematoma can be 0.6 U/mL. In some aspects, the concentration of ecarin present in the ex vivo hematoma can be 0.75 U/mL.

In some aspects, the ex vivo hematomas described herein can further comprise BMP-2. In some aspects, the BMP-2 can be a recombinant BMP-2. In some aspects, the recombinant BMP-2 can comprise human BMP-2. In some aspects, the dose of BMP-2 present in the ex vivo hematoma can be at least 0.01 mg. In some aspects, the dose of BMP-2 present in the ex vivo hematoma can be 0.01 to 5 mg. In some aspects, the dose of BMP-2 present in the ex vivo hematoma can be 0.01, 0.2, 0.3, 0.4, 0.5, 0.6, 0.7, 0.8, 0.9, 1.0, 1.5, 2.0, 2.5, 3.0, 3.5, 4.0, 4.5, 5.0 mg or any number in between. In some aspects, recombinant BMP-2 can be used at a dose of about 0.01 mg to about 12 mg. In some aspects, recombinant BMP-2 can be used at a dose of 0.1, 0.2, 0.3, 0.4, 0.5, 0.6, 0.7, 0.8, 0.9, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0 mg or any number in between. In some aspects, recombinant BMP-2 can be used at a dose higher than 12.0 mg. In some aspects, dose of BMP-2 can be about 1 mg to 5 mg. In some aspects, the dose of BMP-2 present in the ex vivo hematoma can be at least 0.01 µg. In some aspects, the dose of BMP-2 present in the ex vivo hematoma can be 0.01 to 5 µg. In some aspects, the dose of BMP-2 present in the ex vivo hematoma can be 0.01, 0.2, 0.3, 0.4, 0.5, 0.6, 0.7, 0.8, 0.9, 1.0, 1.5, 2.0, 2.5, 3.0, 3.5, 4.0, 4.5, 5.0 µg or any number in between. In some aspects, recombinant BMP-2 can be used at a dose of about 0.01 µg to about 12 µg. In some aspects, recombinant BMP-2 can be used at a dose of 0.1, 0.2, 0.3, 0.4, 0.5, 0.6, 0.7, 0.8, 0.9, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0 µg or any number in between. In some aspects, recombinant BMP-2 can be used at a dose higher than 12.0 µg. In some aspects, dose of BMP-2 can be about 1 µg to 5 µg. In some aspects, the dose of BMP-2 present in the ex vivo hematoma can be between 0.3 and 0.4 µg. In some aspects, the dose of BMP-2 present in the ex vivo hematoma can be lower than the standard dose. In some aspects, the dose of BMP-2 present in the ex vivo hematoma can be 10-50 times lower than the standard dose or the lowest effective dose of BMP-2/ACS.

In some aspects, the amount of the ecarin present in the ex vivo hematoma can be at least 0.05 U/mL; and the amount of BMP-2 present in the ex vivo hematoma can be at least 0.01 mg.

In some aspects, the amount of the ecarin present in the ex vivo hematoma can be at least 0.05 U/mL; and the amount of BMP-2 present in the ex vivo hematoma can be at least 0.01 µg.

In some aspects, the concentration of sodium citrate can be about 3.2 to 4 mg/ml. In some aspects, the solution is about 3.2 to 4% (weight/volume) sodium citrate, in which one part of this solution can then be mixed with nine parts whole blood.

In some aspects, the ex vivo hematomas described herein can further comprise one or more therapeutic agents. In some aspects, the therapeutic agent can be a growth factor. In some aspects, the therapeutic agent can be BMP-2. In some aspects, the therapeutic agent can be recombinant BMP-2. In some aspects, the therapeutic agent can be stem cells or pre-differentiated stem cells, including but not limited to mesenchymal stem cells, adipose stem cells, and induced pluripotent stem cells. In some aspects, the therapeutic agent can be ecarin.

In some aspects, the ex vivo hematoma can be formulated as a liquid or a gel. In some aspects, the ex vivo hematomas can be formulated as a lyophilized or powder form. Said lyophilized or powder forms can make the ex vivo hematoma more stable for storage. In some aspects, the growth factors (BMPs and others), coagulating factors (ecarin, calcium chloride, etc.) and sodium citrate can be available as a lyophilized or powder forms. In some aspects, compounds used for making the ex vivo hematomas disclosed herein can be dissolved in sterile distilled water prior to mixing with whole blood or other blood products (e.g., PRP, plasma, etc.). The diluent is sterile distilled water. No additional components are needed for preparation or storage. Whole blood (or other blood products) can be drawn from a patient before (e.g., immediately before) the surgery, and citrated to prevent clotting. In some aspects, donor blood can be used, for example, for patients with a blood disorder or diseases including but not limited to anemia, hemophilia, leukemia, HIV, etc. The remainder of the components of the ex vivo hematoma do not require any additional stabilizers for storage. For example, BMP-2 is commercially available in a bottle, ready to use; and $CaCl_2$ is available in a powder form, and in some cases may already be dissolved in sterile distilled water (it is very stable after it is dissolved). Both BMP-2 and $CaCl_2$ can be stored at room temperature. Ecarin is available in a lyophilized form (freeze-dried), stored at −20° C., and can be dissolved in sterile distilled water prior to use. The ex vivo hematoma can be prepared relatively simply, using the components described herein in amounts based on the volume of the defect to fill. For this, after the components are prepared, they can be mixed together in a tube/mold. Generally, the ex vivo hematoma will form in about 30 to 45 minutes and then can be inserted (or implanted) into the bone defect. In some aspects, the ex vivo hematomas described herein can be stored, for example, using a "smart storage system" that uses radio-frequency identification-based system (e.g., Smartstorage™) which involves a near real-time tissue tracking system that can streamline inventory management including keeping accurate usage history and temperature logs.

In some aspects, the ex vivo hematomas described herein can further include a carrier. For example the carrier can be a biodegradable biomaterial scaffolds (e.g., silk fibroin scaffolds, poly(lactide-co-glycolide (PLGA), or other similar resorbable products or materials). Such carrier can be used to provide additional mechanical support of the ex vivo hematoma.

In some aspects, the ex vivo hematoma can be formulated for local administration. In some aspects, the compositions (e.g., liquid form) or ex vivo hematomas (e.g., gel form) disclosed herein can be administered locally, implanted surgically or injected percutaneously. In some aspects, the liquid formulation can be delivered through a syringe. In some aspects, the gel formulation can be implanted into the bone defect site. The gel formulation can be prepared using a mold outside of the body that corresponds to the bone size and shape for implantation into the bone defect site. In some aspects, the formulation can be in an intermediate form, between liquid and gel. In some aspects, an intermediate formulation can be applied to a solid bioscaffold to bridge gaps that may be present in the solid bioscaffold itself (e.g., large gaps) while also providing mechanical support independently. Examples of a solid bioscaffold includes but is not limited to titanium cages or other porous metallic implants. Such bioscaffold can be used to reconstruct a skeletal defect or to achieve spinal fusion. The formulations disclosed herein can be used to augment healing when PEEK spinal cages are used for interbody spinal fusions, considering PEEK is itself biologically inert and has no intrinsic bone healing capacity. Alternatively, any of the formulations disclosed herein can be infused or applied topically to resorbable bioscaffolds as may be used to reconstruct skeletal defects, segmental or subsegmental. When used in conjunction with either metallic porous implants or resorbable bioscaffolds, this would also include opening wedge osteotomies (of the femur, tibia, or other long bones), distraction arthrodesis sites, and bone defects related to arthroplasty. Furthermore, the any of the formulations disclosed herein can be applied in the same fashion to other arthrodesis sites with bone defects such as the ankle, knee, wrist, shoulder, hip, or other smaller joints, including but not limited to the Lisfranc joint, smaller joints in the hand, wrist, or foot, and extends to include applications to fill bone defects created when harvesting bone grafts for transposition to a secondary anatomic location.

In some aspects, ecarin can be used alone or combined with one or more components as described herein to stop bleeding. In some aspects, the bleeding can be severe. In some aspects, the bleeding can be arterial, venous or capillary bleeding. In some aspects, ecarin can be formulated as a powder, liquid, or a spray. In some aspects, ecarin can be formulated as a bead (e.g., a collagen bead). In some aspects, ecarin can be formulated as a nanoparticle.

Methods

Disclosed herein are methods of promoting bone healing. Also disclosed herein are methods of producing bone replacement material. Further disclosed herein are methods of producing implants. In some aspects, the methods disclosed herein can be combined. Disclosed herein are methods of promoting bone healing, producing bone replacement material, producing implants or a combination thereof. In some aspects, the methods can comprise administering to a subject in need thereof a therapeutically effective amount of a composition comprising the ex vivo hematoma disclosed herein. Disclosed herein are methods of promoting bone healing, producing bone replacement material, producing implants or a combination thereof in a subject comprising administering to a subject in need thereof a therapeutically effective amount of a composition comprising the ex vivo hematoma disclosed herein In some aspects, the ex vivo hematomas can comprise: (a) isolated whole blood; (b) sodium citrate; and (c) ecarin; oscutarin and calcium chloride; calcium chloride; thrombin; or thrombin and calcium chloride. In some aspects, the ex vivo hematomas can comprise: (a) platelet rich plasma, plasma, or plasma with red blood cells; and (b) ecarin; oscutarin and calcium chloride; calcium chloride; thrombin; or thrombin and calcium chloride. In some aspects, the ex vivo hematoma can further comprise sodium citrate. In some aspects, the ex vivo hematomas can comprise fibrin fibers having a thickness of at least 150-300 nm±10%. In some aspects, the ecarin; oscutarin and calcium chloride; calcium chloride; thrombin; or thrombin and calcium chloride can result in the formation of one or more fibrin fibers having a thickness of at least 150-300 nm±10%. In some aspects, the ex vivo hematoma can comprise (a) isolated whole blood and sodium citrate platelet rich plasma, plasma alone, plasma with red blood cells (without platelets) or other blood products; and (b) one or more coagulating factors. In some aspects, the ex vivo hematomas can comprise whole blood and one or more coagulating factors. In some aspects, the whole blood can comprise one or more viable cells. In some aspects, the whole blood can comprise one or more biological factors. In some aspects, the ex vivo hematoma can comprise whole blood, ecarin, and sodium citrate. In some aspects, the ex vivo hematoma can comprise whole blood, calcium chloride, and sodium citrate. In some aspects, the ex vivo hematoma can comprise platelet rich plasma and ecarin. In some aspects, the ex vivo hematoma can comprise platelet rich plasma and calcium chloride. In some aspects, the ex vivo hematoma can comprise plasma and ecarin. In some aspects, the ex vivo hematoma can comprise plasma and calcium chloride. In some aspects, the ex vivo hematoma can comprise plasma with red blood cells and ecarin. In some aspects, the ex vivo hematoma can comprise plasma with red blood cells and calcium chloride. In some aspects, the ex vivo hematoma can comprise plasma with oscutarin and calcium chloride. In some aspects, the ex vivo hematoma can comprise plasma with thrombin and calcium chloride. In some aspects, the ex vivo hematoma can further comprise bone morphogenetic protein 2 (BMP-2). In some aspects, the BMP-2 can be recombinant BMP-2. In some aspects, the recombinant BMP-2 can comprise human BMP-2. In some aspects, the composition can further comprise one or more growth factors, one or more platelets, and one or more cells. In some aspects, the composition can be formulated as a clot or as a scaffold. In some aspects, the scaffold can be chemotactic. In some aspects, the scaffold can attract endogenous growth factors conducive to bone healing.

In some aspects, the subject can be a human. In some aspects, the subject has a skeletal defect. In some aspects, the skeletal defect can be a large segmental bone defect. In some aspects, the subject has one or more bone fractures. In some aspects, the subject has one or more bone injuries.

In some aspects, the composition can be formulated as a clot or a scaffold. In some aspects, the composition can be formulated as an ex vivo hematoma. In some aspects, the composition can be formulated for local administration. In some aspects, the composition can be administered locally. In some aspects, the composition can be implanted. In some aspects, the composition can be injected percutaneously. In some aspects, the composition can be injected with a syringe. In some aspects, the amount of the ecarin present in the composition can be at least 0.05 U/mL; and the amount of BMP-2 present in the composition can be at least 0.01-5 mg or any amount in between. In some aspects, the amount of the ecarin present in the composition can be at least 0.05 U/mL and the amount of BMP-2 present in the composition can be at least 0.01-1 µg or any amount in between.

In some aspects, the treatment regimen can be a standard treatment regimen for treating any bone defect. Briefly, the defect wound can be debrided, fixed with an internal plate, external fixator or intramedullary nail. The compositions and ex vivo hematomas described herein can then be inserted into the skeletal defect before closing the wound. The treatment regimen can be consistent and invariant provided there is no infection present and the defect is otherwise ready for definitive treatment. The implant disclosed herein can be inserted into bone areas by entering the body through the skin or through a body cavity or an anatomical opening to minimize any additional damage to nearby structures. Selection of the type, including size and shape, of the implant can be based upon many factors, including, but not limited to, the shape and/or size of the bone into which the implant is to be implanted; the percentage of bone density (i.e., the porousness of the remaining bone); and/or the desired rate and distribution of diffusion of the scaffold or implant into the bone; or a combination of such factors. In some aspects, the shape of the implant can be constructed to match the shape of the bone or vertebral body and thus allow for a more uniform distribution of the scaffold, implant or ex vivo hematoma or the components present in the scaffold, implant or ex vivo hematoma. Application of the implant or ex vivo hematoma can occur at the time of surgery or in any other suitable manner.

Disclosed herein are methods of constructing an implant. In some aspects, the methods of constructing an implant comprise: a) dimensioning a depot implant in at least one of a shape and a size that can facilitate implantation of the depot implant into a bone defect; and b) structuring the depot implant to have a scaffold by introducing (i) isolated whole blood and sodium citrate; or platelet rich plasma, plasma alone, plasma with red blood cells (without platelets); and (ii) ecarin; calcium chloride; oscutarin and calcium chloride; thrombin; or thrombin and calcium chloride to create scaffold. In some aspects, the scaffold can have a porosity of 55 to 75%. In some aspects, the scaffold can comprise fibrin fibers having a thickness of at least 150-300 nm±10%. In some aspects, the amount of ecarin present in the scaffold can be at least 0.05 U/mL; and the amount of BMP-2 present in the scaffold can be at least 0.01 mg. In some aspects, the amount of ecarin present in the scaffold can be at least 0.05 U/mL and the amount of BMP-2 present in the scaffold can be at least 0.01 µg. In some aspects, the scaffold can comprise at least one viable blood cell. In some aspects, the scaffold can comprise appropriate biological factors.

In some aspects, the shape of the depot implant can be that of a sphere or cylinder. In some aspects, the shape of the depot implant can be that of a sphere or any other patient specific geometries, forms, or shapes as dictated by clinical exigency. In some aspects, the cylinder shape can be at least 5 mm to about 30 cm (or more) in length. In some aspects, the cylinder shape can be at least 1 mm to about 60 mm (or more) in diameter. In some aspects, the cylinder shape can be straight, and/or curved. In some aspects, the cylinder shape can be a straight rod or a curved rod. The cylinder or rod shape can be any shape with a longitudinal axis that can be longer along one direction than in other directions. The cross-sectional shape of the depot across the longitudinal axis can be any shape. In some aspects, the cross-section shape can be elliptical, circular, trefoil, or any other shape. In some aspects, the implant can be either straight or curved in such longitudinal direction. The end surface of the implant can be shaped such that it is either flat, rounded or convoluted in shape.

The dimensions of the implant can depend on the size of the bone defect and the anatomical site treated. In some aspects, the scaffold can be approximately 20% longer than the actual size of the defect, so that it tightly fits and completely fills the volume of the missing bone. For example, if the size of the bone defect is 3 cm, and it is an adult midshaft femur, the implant will likely need to be constructed with dimensions, for example, that are about 3-4 cm in diameter and 3.6 cm in length. In some aspects, the scaffold can resemble the size and shape of a given bone defect. In some aspects, the scaffold can be chemotactic.

As disclosed herein are methods of constructing an implant. The methods of constructing an implant comprise: a) dimensioning a depot implant in at least one of a shape and a size that can facilitate insertion or implantation of the depot implant into a bone defect; b) structuring the depot implant to have a scaffold by introducing (i) isolated whole blood and sodium citrate; or platelet rich plasma, plasma, or plasma with red blood cells; and (ii) ecarin; oscutarin and calcium chloride; calcium chloride; thrombin; or thrombin and calcium chloride to create the scaffold. In some aspects, the scaffold can have a porosity of 55 to 75%. In some aspects, the scaffold can be constructed in the form of a clot. In some aspects, the ex vivo hematoma can further comprise one or more growth factors. In some aspects, the one or more growth factors can be bone morphogenetic protein 2 (BMP-2), BMP-7, BMP-4, BMP-6, BMP-9, BMP-14, platelet-derived growth factor, vascular endothelial growth factor, fibroblast growth factor 2, or a combination thereof. In some aspects, the BMP-2 can be introduced into the scaffold or ex vivo hematoma. Additionally, the scaffold or clot or ex vivo hematoma can be biodegradable such that it degrades without the necessity of surgical removal.

Also disclosed herein are methods of using any of the compositions described herein to initiate or enhance bone healing. Also disclosed herein are methods of using any of the compositions described herein to reconstruct segmental bone defects. Also disclosed herein are methods of using any of the compositions described herein to reconstruct segmental bone defects resulting from tumors, trauma, or infection, using ecarin to create a biomimetic haematoma, 12q that initiates the normal fracture healing cascade by delivering catalytic amounts of BMP that then hyperactivates endogenous growth factors locally.

Also disclosed herein are methods of using any of the compositions described herein to treat fractures at risk (e.g., in the osteoporotic, diabetic, elderly, or smokers). Also disclosed herein are methods of using any of the compositions described herein to treat fractures at risk using ecarin to create a biomimetic hematoma that initiates the normal fracture healing cascade by delivering catalytic amounts of BMP that then hyperactivates endogenous growth factors locally.

Also disclosed herein are methods of using any of the compositions described herein to treat atypical femur fractures. Also disclosed herein are methods of using any of the compositions described herein to treat atypical femur fractures percutaneously using ecarin to create a biomimetic hematoma that initiates the normal fracture healing cascade by delivering catalytic amounts of BMP that then hyperactivates endogenous growth factors locally.

Also disclosed herein are methods of using any of the compositions described herein to treat minimally displaced femoral neck fractures. Also disclosed herein are methods of using any of the compositions described herein to treat minimally displaced femoral neck fractures percutaneously using ecarin to create a biomimetic hematoma that initiates the normal fracture healing cascade by delivering catalytic amounts of BMP that then hyperactivates endogenous growth factors locally.

Also disclosed herein are methods of using any of the compositions described herein to treat osteoporotic insufficiency fractures (pelvis, spine). Also disclosed herein are methods of using any of the compositions described herein to treat osteoporotic insufficiency fractures (e.g., pelvis, spine) percutaneously using ecarin to create a biomimetic hematoma that initiates the normal fracture healing cascade by delivering catalytic amounts of BMP that then hyperactivates endogenous growth factors locally.

Also disclosed herein are methods of using any of the compositions described herein to augment spinal fusion procedures in conjunction with spinal cages (either ceramic, PEEK, or metallic alloys). Also disclosed herein are methods of using any of the compositions described herein to augment spinal fusion procedures in conjunction with spinal cages (either ceramic, PEEK, or metallic alloys) that allow full immediate weight-bearing, provide more stable fixation, and enhance postoperative recovery, using ecarin to induce local formation of a biomimetic hematoma embedded on the substrate comprising the cage, that initiates a bone healing cascade by delivering catalytic amounts of BMP that then hyperactivates endogenous growth factors locally.

Also disclosed herein are methods of using any of the compositions described herein to treat delayed union of long bone fractures (percutaneously or open). Also disclosed herein are methods of using any of the compositions described herein to treat delayed union of long bone fractures (percutaneously or open) using ecarin to create a biomimetic hematoma, that initiates a fracture healing cascade by delivering catalytic amounts of BMP that then hyperactivates endogenous growth factors locally.

Also disclosed herein are methods of using any of the compositions described herein to treat established non-unions of long bone fractures (percutaneously or open). Also disclosed herein are methods of using any of the compositions described herein to treat established non-unions of long bone fractures (percutaneously or open) using ecarin to create a biomimetic hematoma, that initiates a fracture healing cascade by delivering catalytic amounts of BMP that then hyperactivates endogenous growth factors locally.

Also disclosed herein are methods of using any of the compositions described herein to improve (e.g. accelerate) healing of long bone fractures. Also disclosed herein are methods of using any of the compositions described herein to improve (e.g. accelerate) healing of long bone fractures in selected candidates (such as high-performance athletes) to facilitate more rapid recovery, by using ecarin to create a biomimetic hematoma, that initiates a fracture healing cascade by delivering catalytic amounts of BMP that then hyperactivates endogenous growth factors locally.

Also disclosed herein are methods of using any of the compositions described herein to accelerate healing of long bone fractures in selected veterinary candidates (such as thoroughbred racehorses). Also disclosed herein are methods of using any of the compositions described herein to accelerate healing of long bone fractures in selected veterinary candidates (such as thoroughbred racehorses) to facilitate more rapid recovery, by using ecarin to create a biomimetic hematoma, that initiates a fracture healing cascade by delivering catalytic amounts of BMP that then hyperactivates endogenous growth factors locally.

Also disclosed herein are methods of using any of the compositions described herein to facilitate more rapid and predictable dental and maxilla-facial reconstructions. Also disclosed herein are methods of using any of the compositions described herein to facilitate more rapid and predictable dental and maxilla-facial reconstructions by using ecarin to create a biomimetic hematoma that initiates a bone formation cascade by delivering catalytic amounts of BMP that then hyperactivates endogenous growth factors locally.

Also disclosed herein are methods of using any of the compositions described herein to and reverse conditions resulting in spontaneous jaw bone resorption. Also disclosed herein are methods of using any of the compositions described herein to and reverse conditions resulting in spontaneous jaw bone resorption, using ecarin to create a biomimetic hematoma to regenerate bone locally.

Also disclosed herein are methods of using any of the compositions described herein to treat and/or reverse conditions resulting in spontaneous osteonecrosis. Also disclosed herein are methods of using any of the compositions described herein to and reverse conditions resulting in spontaneous osteonecrosis, using ecarin to create a biomimetic hematoma delivered percutaneously or open (such as Kienböck's disease, avascular necrosis of the femoral head, and osteonecrosis of various other anatomic locations including, but not limited to, the femoral condyles).

Also disclosed herein are methods of using any of the compositions described herein to treat and/or reverse conditions resulting in spontaneous avascular necrosis of the femoral head where the femoral head has collapsed. Also disclosed herein are methods of using any of the compositions described herein to treat and/or reverse conditions resulting in spontaneous avascular necrosis of the femoral head where the femoral head has collapsed, using ecarin to create a biomimetic hematoma delivered in an open procedure following surgical dislocation of the hip.

Also disclosed herein are methods of using any of the compositions described herein to treat osteonecrosis resulting from chemotherapy, alcoholism, smoking, or other exogenous agents. Also disclosed herein are methods of using any of the compositions described herein to treat osteonecrosis resulting from chemotherapy, alcoholism, smoking, or other exogenous agents, using ecarin to create a biomimetic hematoma delivered percutaneously or open.

Also disclosed herein are methods of using any of the compositions described herein to augment any standard fusion procedures. Also disclosed herein are methods of using any of the compositions described herein to augment any standard fusion procedures (e.g., hip, knee, ankle, wrist, elbow, shoulder, subtalar joint, any of the limited fusions in the carpus or midfoot, fusions in any of the smaller joints such as the hallux, pollex, or lesser digits, either toes or fingers), using ecarin to create a biomimetic hematoma, that initiates a bone formation cascade by delivering catalytic amounts of BMP that then hyperactivates endogenous growth factors locally.

Also disclosed herein are methods of using any of the compositions described herein to accelerate healing of scaphoid waist fractures. Also disclosed herein are methods of using any of the compositions described herein to accelerate healing of scaphoid waist fractures to facilitate more rapid recovery, by using ecarin to create a biomimetic hematoma that initiates a fracture healing cascade by delivering catalytic amounts of BMP that then hyperactivates endogenous growth factors locally.

Also disclosed herein are methods of using any of the compositions described herein to reconstruct complex skeletal defects. Also disclosed herein are methods of using any of the compositions described herein to reconstruct complex skeletal defects in the skull, whether resulting from trauma, tumour, or infection, by using ecarin to create a biomimetic hematoma that initiates a bone formation cascade by delivering catalytic amounts of BMP that then hyperactivates endogenous growth factors locally.

Also disclosed herein are methods of using any of the compositions described herein to accelerate healing of sternotomies. Also disclosed herein are methods of using any of the compositions described herein to accelerate healing of sternotomies associated with open heart surgery to facilitate more rapid recovery, by using ecarin to create a biomimetic hematoma that initiates a fracture healing cascade by delivering catalytic amounts of BMP that then hyperactivates endogenous growth factors locally.

Also disclosed herein are methods of using any of the compositions described herein in joint arthroplasty components with specially adapted bone ingrowth surfaces augmented with ecarin to induce local formation of a biomimetic hematoma embedded on a structural substrate, that more rapidly initiates a bone healing cascade.

Also disclosed herein are methods of using any of the compositions described herein with osseointegration stems and components with specially adapted bone ingrowth surfaces augmented with ecarin to induce local formation of a biomimetic hematoma embedded on a structural substrate, that more rapidly initiates a bone healing cascade.

As used herein, the term "biomimetic hematoma" can be used to refer to an "ex vivo hematoma".

Also disclosed herein are methods of using any of the compositions described herein to reduce bleeding or manage bleeding.

Also disclosed herein are methods of using any of the compositions described herein to manage widespread venous bleeding/ooze during surgical procedures. In some aspects, in the methods disclosed herein any of the compositions described herein can be formulated to be sprayed on topically as an aqueous aerosol (using an atomizer for ecarin distribution to affected areas).

Also disclosed herein are methods of using any of the compositions described herein to manage bleeding or stop bleeding from individual injured vessels (e.g., massive bleeder) intra-operatively or in an emergency casualty situation. In some aspects, in the methods disclosed herein any of the compositions described herein can be administered on a bead (e.g. magnetic bead). In some aspects, in the methods disclosed herein any of the compositions described herein can be applied as a clamp/clamshell on the end of a vessel to simultaneously clamp off and deliver ecarin locally, restricting the application to the specific injured vessel end. The clamp or clamp element can constrict the adjacent injured vessel adjacent, and can eliminate or minimize the risk of systemic administration of the compositions.

Also disclosed herein are methods of using any of the compositions described herein as a selective embolization. In some aspects, in the methods disclosed herein any of the compositions described herein can be delivered via an interventional radiologist to one or more targeted blood vessels to manage or stop intra-pelvic/intra-abdominal/oesophageal/intra-cranial bleeding using a long radiographically directed catheter that then allows selective and highly specific administration of ecarin limited to discrete pathology as indicated (e.g., similar to methods carried out using angiographic coils).

Also disclosed herein are methods of using any of the compositions described herein to treat menometrorrhagia. In some aspects, the methods disclosed herein can be used to direct the installation or placement of any of the compositions described herein into the uterus in affected women. In some aspects, ecarin can be formulated to be delivered as part of a bio-degradable collagen bead(s).

Also disclosed herein are methods of using any of the compositions described herein to treat hemophiliac associated spontaneous hemarthrosis. In some aspects, ecarin can be formulated to be delivered as part of a bio-degradable collagen bead(s).

Also disclosed herein are methods of using any of the compositions described herein to treat spontaneous hemarthrosis related to an anti-coagulant overdose (e.g., warfarin, coumadin, etc). In some aspects, ecarin can be formulated to be delivered as part of a bio-degradable collagen bead(s).

Also disclosed herein are methods of using any of the compositions described herein to treat spontaneous intramuscular bleeds related to an anti-coagulant overdose (e.g., warfarin, coumadin, etc.). In some aspects, in the methods disclosed herein any of the compositions described herein can be used as a selective embolization.

Also disclosed herein are methods of using any of the compositions described herein to treat spontaneous intramuscular bleeds related to haemophilia. In some aspects, in the methods disclosed herein any of the compositions described herein can be used as a selective embolization.

Also disclosed herein are methods of using any of the compositions described herein to treat post-operative hemarthrosis in any elective total knee replacement. In some aspects, ecarin can be formulated to be delivered as part of a bio-degradable collagen bead(s) or nanoparticle(s). In some aspects, the bio-degradable collagen bead(s) or nanoparticle(s) can be delivered or sprinkled liberally into the joint immediately prior to closure of the wound.

Also disclosed herein are methods of using any of the compositions described herein to treat epistaxis. In some aspects, ecarin can be formulated to be delivered as part of a bio-degradable collagen bead(s). In some aspects, the bio-degradable collagen bead(s) can be embedded in a fabric packing material or enclosed within a fabric sheath to limit their distribution and contain them locally. In some aspects, ecarin can be delivered in the form of a nasal pack, such that the ecarin is formulated to be a part of a bio-degradable collagen bead(s) that is embedded in a fabric packing material or enclosed within a fabric sheath.

Also disclosed herein are methods of using any of the compositions described herein to treat retinal haemorrhage. In some aspects, in the methods disclosed herein any of the compositions described herein can be used as a selective embolization. In some aspects, ecarin can be formulated to be delivered as part of a bio-degradable collagen bead(s) or nanoparticle(s). In some aspects, the bio-degradable collagen bead or nanoparticle formulation can be used to create a Velcro-type effect by creating a self-adherent geometry to minimize the risk of recurrence and actively address retinal detachment.

In some aspects, "bleeding" can be a hemorrhage. In some aspects, blood can be escaping the circulatory system from one or more damaged blood vessels. In some aspects, bleeding can be internal or external.

Articles of Manufacture

The composition and ex vivo hematomas described herein can be packaged in a suitable container labeled, for example, for use as a therapy to treat bone defects or any of the methods disclosed herein. Accordingly, packaged products (e.g., sterile containers containing the compositions or ex vivo hematomas described herein and packaged for storage, shipment, or sale at concentrated or ready-to-use concentrations) and kits, including at least isolated whole blood and sodium citrate; or platelet rich plasma, plasma, or plasma with red blood cells; and ecarin; oscutarin and calcium chloride; calcium chloride; thrombin; or thrombin and calcium chloride as described herein and instructions for use, are also within the scope of the disclosure. A product can include a container (e.g., a vial, jar, bottle, bag, or the like) containing the composition or ex vivo hematomas described herein. In addition, an article of manufacture further may include, for example, packaging materials, instructions for use, syringes, buffers or other control reagents for treating or monitoring the condition for which prophylaxis or treatment is required. The product may also include a legend (e.g., a printed label or insert or other medium describing the product's use (e.g., an audio- or videotape). The legend can be associated with the container (e.g., affixed to the container) and can describe the manner in which the compositions or ex vivo hematomas therein should be administered (e.g., the frequency and route of administration), indications therefore, and other uses. The compositions or ex vivo hematomas can be ready for administration (e.g., present in dose-appropriate units), and may include a pharmaceutically acceptable adjuvant, carrier or other diluent. Alternatively, the compounds can be provided in a concentrated form with a diluent, with accompanying instructions for dilution.

EXAMPLES

Example 1: Structural and Biological Properties of Hematomas

An approach to healing large segmental bone defects. It has been well established that hematoma formed at the fracture site significantly influences the way fractures heal. For example, studies have shown that the removal of a hematoma delays fracture healing (Schell H, Peters A, Duda G N. Removal of fracture hematoma and replacement with fresh hematoma delays bone healing in sheep. Bone. 2012). Furthermore, there are reports that suggest the structural properties of a formed fibrin clot, such as porosity and thickness of fibrin fibers, influences bone repair (Wang X, Friis T E, Masci P P, Crawford R W, Liao W, Xiao Y. Alteration of blood clot structures by interleukin-1 beta in association with bone defects healing. Sci Rep. Nature Publishing Group; 2016; 6: 35645; and Wang X, Friis T, Glatt V, Crawford R, Xiao Y. J Tissue Eng Regen Med. 2017; 11: 2864-2875.) The results described herein demonstrate that in vivo hematomas isolated from 0.5 mm rat femoral defects (normally healing fractures) had 35% thinner fibrin fibers (209±20 nm) as compared to 5 mm segmental bone defects (do not heal without an intervention; 320±64 nm) 3 days after surgery (FIGS. 2, 7, 8 and 9). Furthermore, a less porous network was also observed in 5 mm defects compared to 0.5 mm (42.56% vs 50.03%), resulting in a 16% difference between the groups. To investigate whether there are differences in biological properties between the hematomas formed in large bone defects (5 mm) and normally healing fractures (0.5 mm), an in vivo study was performed using RNA sequencing analysis (Table 1).

Major differences were found for genes mediating the inflammatory response (e.g. Il1b—produced by activated macrophages; Sdf1—expressed in the area of inflammatory bone destruction, where it mediates their suppressive effect on osteoclastogenesis), which were predominantly upregulated in 5 mm vs. 0.5 mm defects. Genes important for extracellular matrix (ECM) structural constituents (e.g. Col1a1, Col2a1, CoBa1), as well as ECM proteases (e.g. Mmp2) and their inhibitors (e.g. Timp1) were mostly downregulated. In contrast, genes modulating cell adhesion molecules (e.g. Thbs1) were upregulated. The analysis of genes involved in the processes of angiogenesis showed that angiogenin (Ang), a potent stimulator of new blood vessel formation, was downregulated, while an angiogenic cytokine, endothelin (Edn1), a potent vasoconstrictor that also stimulates cells in the osteoblast lineage, was upregulated. The expression of genes related to osteogenesis demonstrated a significant portion of downregulated genes involved in osteoblast differentiation (e.g. Bglap, also known as osteocalcin—secreted by osteoblasts to initiate bone repair) and bone formation (e.g. Bmp7—plays a key role in the transformation of mesenchymal cells into bone and cartilage).

TABLE 1

Gene regulation.

| Gene symbol | Description | Function | Regulation |
|---|---|---|---|
| Il1b | Interleukin 1 Beta | Inflammatory response | up |
| Sdf1 | Stromal Cell-Derived Factor 1 | Inflammatory response | up |
| Col1a1 | Collagen Type I Alpha 1 | ECM constituent | down |
| Col2a1 | Collagen Type II Alpha 1 | ECM constituent | down |
| Col3a1 | Collagen Type III Alpha 1 | ECM constituent | down |
| Mmp2 | Matrix Metallopeptidase 2 | ECM protease | down |
| Timp1 | Tissue Inhibitor Of Metalloproteinases 1 | ECM protease inhibitor | down |
| Thbs1 | Thrombospondin 1 | Cell adhesion molecule | up |
| Ang | Angiogenin | Angiogenic growth factor | down |
| Edn1 | Endothelin 1 | Angiogenic factor | up |
| Bglap | Bone Gamma-Carboxyglutamate Protein | Initiator of bone repair | down |
| Bmp7 | Bone Morphogenetic Protein 7 | Bone formation | down |

These results are the first to demonstrate important differences in gene expression between normally healing fractures and large bone defects during the earliest phases of bone healing. The most striking differences were found in the set of genes involved in the inflammatory response, a key event after fracture. The upregulation of inflammatory genes in 5 mm vs. 0.5 mm defects suggests that a large bone defect induces a stronger inflammatory response than does a normal fracture, which leads to an increased recruitment of macrophages, fibroblasts, MSCs, and osteoprogenitor cells. The invading inflammatory cells also produce proangiogenic cytokines, which explains the upregulation observed when comparing 5 mm vs. 0.5 mm defects. At the same time, the downregulation of many genes important for skeletal development, bone mineral metabolism, and the formation of an ECM, suggests there is a reduced osteogenic response in large bone defects.

Figure 11:
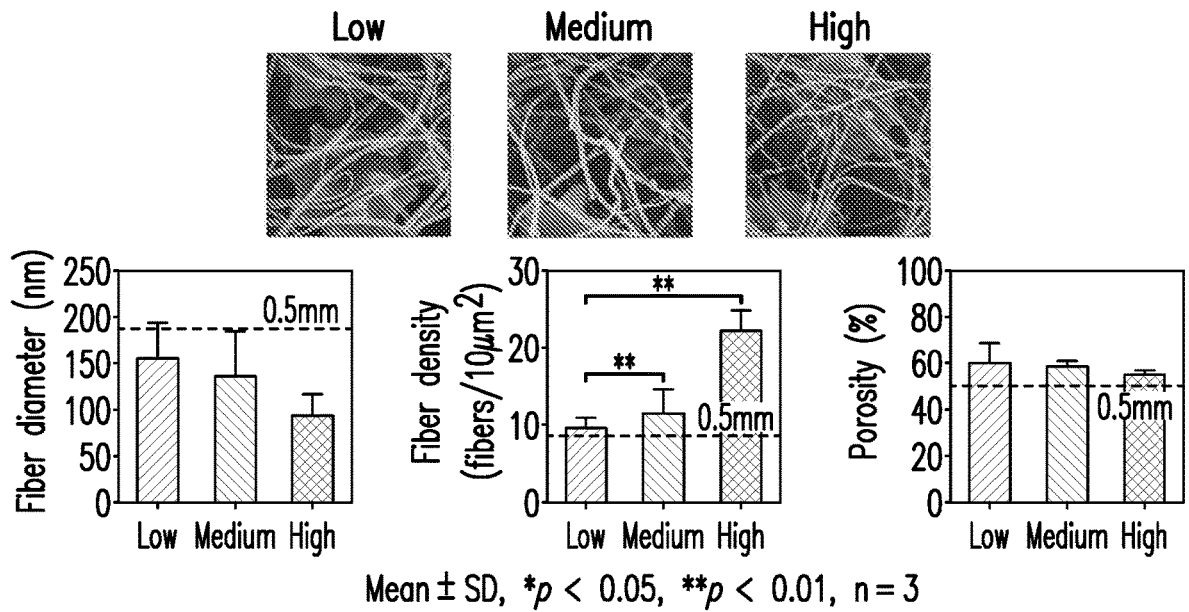
FIG. 11 shows scanning electron microscopy images of rat ex vivo blood clots microarchitecture (top) and quantification of fiber diameter, fiber density and porosity (bottom); mean±SD, *p<0.05, **p<0.01, n=3.
Figure 12:
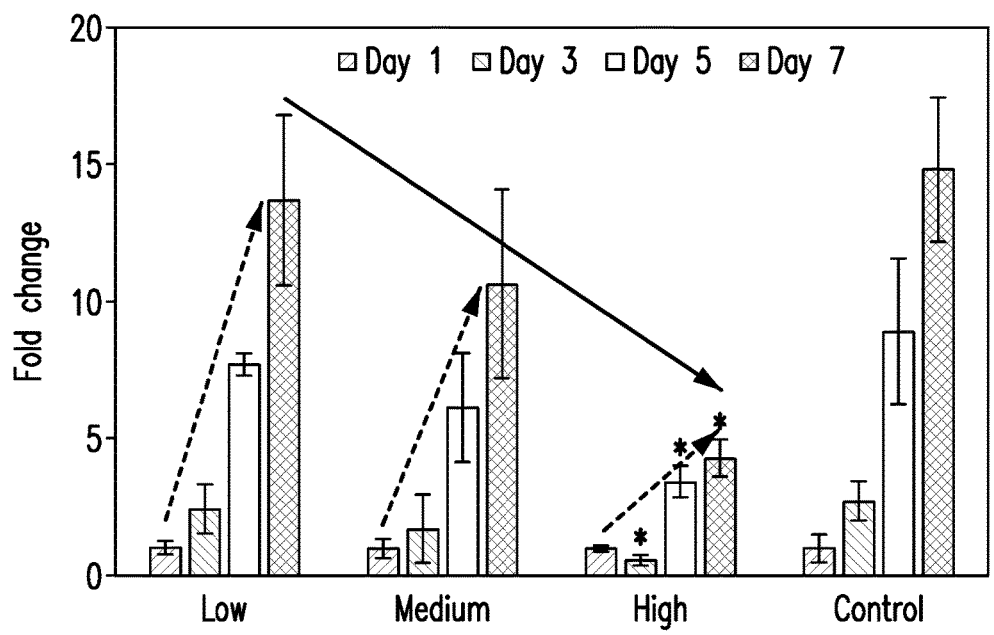
FIG. 12 shows cell viability of rat MSCs in the presence of the snake venom enzyme, ecarin (2D, in vitro; *p<0.05, n=3).
Figure 13:
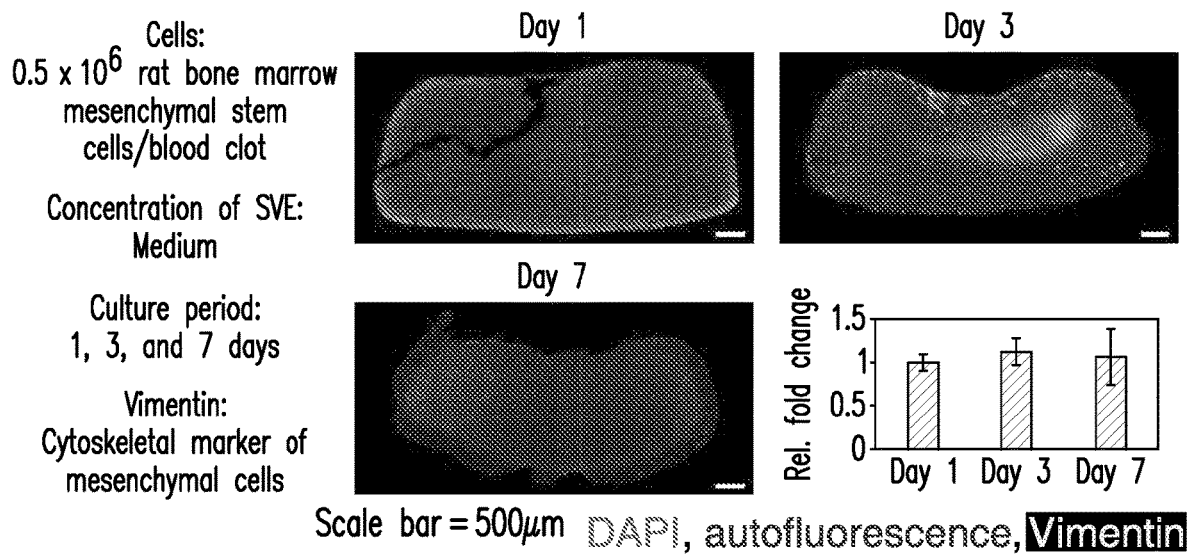
FIG. 13 shows cell viability in tissue culture in the presence of the snake venom enzyme, ecarin (3D, in vitro).

An in vitro study was also conducted to determine whether an ex vivo blood clot could be produced with specific structural properties using a SVCE, ecarin, and to determine whether ecarin is toxic to stem cells. The results convincingly showed that the structural properties of blood clots varied depending on the concentration of ecarin (FIG. 11). For instance, higher concentrations of ecarin resulted in thinner fibrin fibers with an average thickness of 93±3 nm, whereas at the lowest concentration, the thickness of fibrin fibers was 173±9 nm. The rate of cell proliferation from 1 to 7 days was lower with an increasing concentration of ecarin (FIG. 12). For example, there was a 4.3±0.7-fold increase at the highest concentration, whereas at the lowest concentration there was a 13.7±3.1-fold increase, compared to 14.8±2.6-fold increase without ecarin. Cells cultured within ex vivo hematomas had stable cell numbers over a 7-day period. Thus, these results suggest that ecarin does not cause toxicity, however, higher concentrations might result in lower cell proliferation rates (FIG. 13).

Based on these observations, additional experiments will be carried out to determine the structural and biological properties of formed hematomas in normal fractures, which heal, and compare them to large bone defects, which do not heal without intervention (see Examples below). For example a well-organized fibrin clot will be studied for its ability to enhance bone healing by serving as a temporary reservoir for the continuous release of growth factors, and by providing adequate space to assist cell infiltration, proliferation, and differentiation. Therefore, the main opportunity for enhancing the repair process lies with the production of a blood clot that mimics intrinsic properties of healing fracture hematoma. The structural properties of an ex vivo produced hematoma can be altered using SVCEs, thereby mimicking intrinsic fracture hematoma which, when implanted into a segmental bone defect, will enhance and accelerate bone healing. Various snake venoms have been used successfully in patients with heart disease, cancer, and strokes as well as for diagnostic purposes for diseases such as lupus. Thus, these experiments will also be the first to examine the use of the snake venom enzyme, ecarin, as an alternative clotting agent compared to the addition of bovine thrombin, which has been shown to have side effects when used clinically (Diesen D L, Lawson J H. Vascular. 2008; 16: S29-36; Ofosu F A, Crean S, Reynolds M W. Clin Ther. 2009; 31: 679-691; and Sands J J, Nudo S A, Ashford R G, Moore K D, Ortel T L. Am J Kidney Dis. 2000; 35: 796-801). This approach will be explored as an improved treatment strategy, as it is a bio-scaffold that can be used to enhance bone healing more reliably by either completely eliminating the need of growth factors such as BMPs, or significantly minimizing the doses required to enhance the repair process of bones. The result is a more innate treatment strategy than what is currently available; it would offer significant cost savings and, most importantly, eliminate the many adverse side effects associated with high doses of BMPs. Furthermore, the results described herein may have significant implications for the treatment of bone injuries to the general public as well as to the service personnel.

Example 2: Structural and Biological Properties of In Vivo Fracture Hematomas

Bone defects were created in groups of male SAS Fischer rats (10-12 weeks of age, n=38; n=5-8/group), and stabilized with external fixators (RISystem A G; Glatt V, Evans C H, Matthys R. Eur Cell Mater. 2012; 23: 289-98; discussion 299; and Glatt V, Miller M, Ivkovic A, Liu F, Parry N, Griffin D, et al. J Bone Joint Surg Am. 2012 Nov. 21; 94(22):2063-73) to characterize and compare the structural and biological properties of hematomas formed during normal bone healing (0.5 mm; FIG. 3A) and large segmental bone defects (5 mm; FIG. 3B). To evaluate the course of fracture healing, a 0.5 mm osteotomy, which is also possible with the same external fixation device, was performed. The reason for using osteotomies is that they are reproducible and allow for a more consistent size of hematoma formation, which is important for characterization of hematoma structural properties. Animals were sacrificed at 3 days following surgery to evaluate the structural properties of the fracture hematoma, after the blood clots are mature (FIGS. 3A, B). Structural properties of hematomas, such as thickness, density, and porosity of the fibrin fibers were assessed using scanning electron microscopy (SEM; n=8/group) and ImageJ software. Furthermore, a different set of samples were used to analyze differentially expressed genes involved in the initiation of the bone repair process using RNA sequencing (n=6/group). Histology and immunohistochemistry (IHC) will also be performed (n=5/group) to characterize the tissues and confirm the presence of key proteins involved in the initiation of the repair process, such as macrophages (CD68, CD40, and CD206) osterix, PECAM1, vWF, VEGF, type I collagen, and H&E for an overall tissue morphology. The results were used to determine whether there is a correlation between the structural properties and the expression of specific genes and proteins in 3 day-old hematomas.

Methods. Rat, Large Critical Sized Defect and Osteotomy Models. Male SAS Fischer rats (Charles River Laboratories, Inc., Wilmington, MA, USA), weighing approximately 200-250 g (10-12 weeks old) were anesthetized by the administration of isofluorane (2%; 2 l/min) with a small animal vaporizer. The animals then received intramuscular injections of 20 mg/kg of cefazolin (antibiotic) and 0.08 mg/kg buprenorphine (analgesic) into the left thigh. Detailed information of the surgical procedure can be found (Glatt V, Matthys R. Adjustable stiffness, external fixator for the rat femur osteotomy and segmental bone defect models. J Vis Exp. 2014). Briefly, the right hind leg of each animal was shaved, disinfected with chlorhexidine, placed in a sterile field and covered with a sterile surgical drape exposing only the right leg. An incision of approximately 3.5-4 cm was made through the skin running anterior-lateral on the surface of the right femur from the greater trochanter to the supracondylar region of the knee. The shaft of the femur was exposed by gentle dissection between the quadriceps and hamstring muscles. The external fixator bar was first clipped on the Gigli wire saw guide, and then placed on the anterior-lateral aspect of the femur to guide the drill and permit reproducible positioning of four drill holes using a pen drill (RISystem A G, Davos Platz, C H). The mounting pins were inserted into the predrilled holes one at a time, starting at the proximal side. After the fixator was in place, the saw guide was used to make the defects. For this, a Gigli wire saw was passed through the two grooves underneath the femur to create a 5 mm segmental defect by reciprocal motion back and forth, and a single wire saw was used to create a 0.5 mm defect. When the defects have been created, the saw guide was removed, and the wound was closed in layers. The rats were given analgesic every 12 hours and antibiotic every 24 hours for three days post-surgery. Hematomas were collected at 3 days for structural and biological analyses.

Scanning Electron Microscopy. The in vivo fracture hematomas and ex vivo blood clots were treated similarly. The samples were fixed in 4% paraformaldehyde overnight. Gross morphology was captured at 100-1,000× magnification using the Hitachi SU1510 VP-SEM. For analyses of fiber diameter and density, the samples were post-fixed in 4% osmium tetroxide and dehydrated through a gradient of ethanol solutions (25-100%). Slices of the hematomas and blood clots were then dried using the Leica EM Critical Point Dryer, mounted on silicon chip specimen supports, and sputter-coated with gold-palladium before being imaged at 10,000× (Hitachi 55500 SEM/STEM) to reveal structural properties at high resolution. The images were analyzed using ImageJ.

RNA-Sequencing. Parallel sequencing of RNA (RNA-Seq) is a high throughput method that allows global measurement of gene transcript abundance (Wang Z, Gerstein M, Snyder M. RNA-Seq: A revolutionary tool for transcriptomics. 2009. pp. 57-63). To determine differential expression of genes in the fracture hematomas, samples were collected into microcentrifuge tubes, immediately snap-frozen in liquid nitrogen and stored at −80° C. RNA extractions were performed using the Qiagen RNeasy Plus Universal Tissue Mini (Qiagen, Inc., Germantown, MD, USA) following the manufacturer's protocol. The concentration and quality of the RNA were determined using a nanodrop spectrophotometer (ND-1000, Thermo Fisher Scientific, Inc.), and RNA integrity was assessed using an Agilent 2100 Bioanalyzer (Agilent Technologies, Inc., Santa Clara, CA, USA) according to the manufacturer's protocol. The bone cylinder, which is removed to create 5 mm bone defects, was used as a control representing the gene expression status of healthy bone. The global transcriptome analysis was used to identify up-regulated and/or down-regulated genes that have a major influence in the initiation process of bone repair. This work was performed using the llumina HiSeq 3000.

Histology and Immunohistochemistry. Samples will be stained with hematoxylin and eosin to view gross tissue morphology. Standard immunohistochemistry protocols will be applied to paraffin embedded sections (5 µm). The sections will be labeled with a panel of antibodies to determine the spatial expression of proteins such as macrophages (CD68 and CD206), osterix, PECAM1, type II collagen, type X collagen (Maes C, Kobayashi T, Selig M K, Torrekens S, Roth S I, Mackem S, et al. Osteoblast precursors, but not mature osteoblasts, move into developing and fractured bones along with invading blood vessels. Dev Cell. Elsevier Ltd; 2010; 19: 329-344).

To carry out these experiments, a 5 and 0.5 mm femoral bone defect model was used, and stabilized with the external fixation device described. This is a well-established research model. The major outcome measures that were used are scanning electron microscopy, RNA sequencing, and histology/immunohistochemistry, which are routine procedures. As disclosed herein, data using the SEM (FIGS. 2, 7, 8, and 9) and RNA sequencing analysis showed that there are discernible differences in structural and biological properties between hematomas formed in the 0.5 mm defect compared to the 5 mm defect (Table 1).

Figure 7:
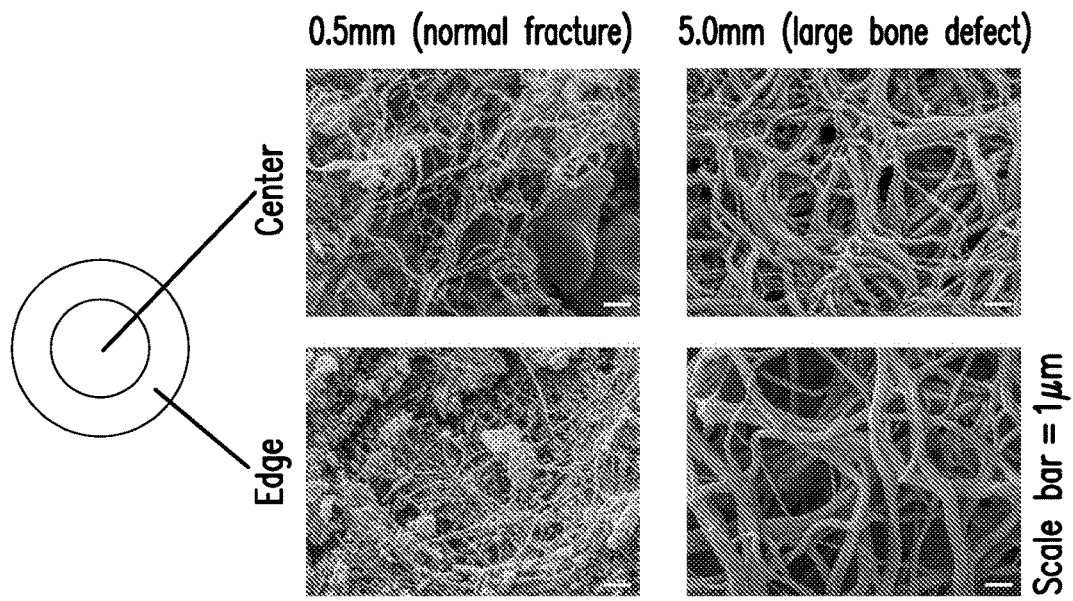
FIG. 7 shows scanning electron microscopy images of fracture hematomas: 0.5 mm (left image; normal fracture) and 5 mm (right image; large bone defects). Scale=1 μm.
Figure 8:
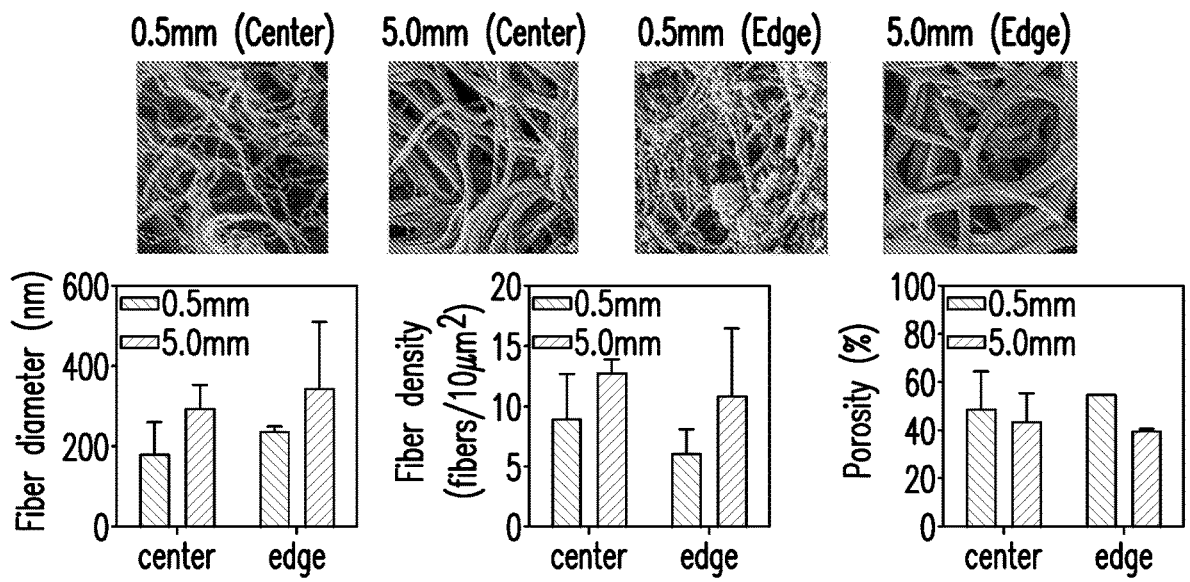
FIG. 8 shows scanning electron microscopy images of rat fracture hematomas (top) and quantification of fiber diameter, fiber density and porosity (bottom).
Figure 9:
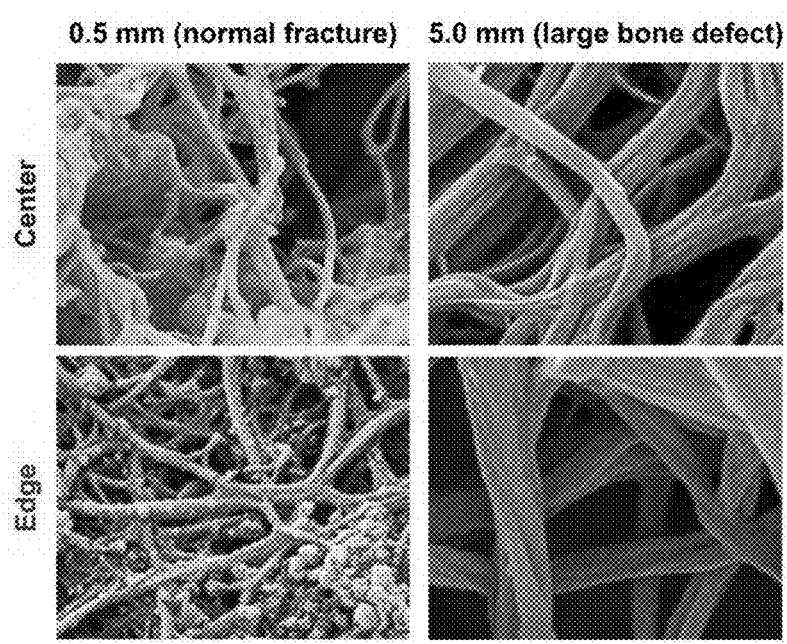
FIG. 9 shows scanning electron microscopy images depicting fibrin fiber topography.

FIGS. 7-9 show scanning electron microscopy images depicting the structural properties of fracture hematomas. These data show clear structural differences between normally healing fractures (0.5 mm) and large bone defects (5 mm). The normal fracture (0.5 mm) showed a more porous, less dense and thinner fibrin fibers, and rougher surface. The large bone defect (5 mm) showed a less porous, denser and thicker fibrin fibers, and smooth surface.

Example 3: Structural Properties of an Ex Vivo Formed Blood Clot/Hematoma Using a Snake Venom Clotting Enzyme The SVCE, ecarin, was used to alter the structural properties of blood clots in an effort to mimic the properties of natural hematomas formed in a 0.5 mm osteotomy model using various concentrations of ecarin. Whole blood was collected from the same animals used in Example 2 by cardiac puncture using a 21-gauge needle at the time of euthanasia. The anticipated yield of blood was approximately 5-10 mL per animal. The blood was mixed with one part 4% sodium citrate solution to nine parts of blood to prevent coagulation. The purified enzyme from Saw-scaled viper venom, ecarin, was purchased from Sigma (Sigma-Aldrich Co., St. Louis, MO, USA). Variables such as pH, ionic strength and calcium was kept constant, whereas the prothrombotic enzyme was applied across a range from pico to nano molar for the final concentrations. Calcium chloride ($CaCl_2$) and $CaCl_2$+recombinant human thrombin was used as controls. The ex vivo blood clots are intended to have a cylindrical shape with a height of 5 mm to span the defect size, and a diameter of 4 mm, consistent with the average diameter of a rat femur. Blood clots with a height of 0.5 mm were used as controls to determine if the same concentration of SVCE added to a smaller volume of blood produces the same structural properties in the formed blood clot. Structural changes, in particular the thickness and density of fibrin fibers, and the overall clot structure, was evaluated using SEM. FIGS. 4A-D shows blood clots in rats with different structural properties using the methods described herein.

Preparation of Ex Vivo Blood Clots. To create ex vivo blood clots, 5-10 mL whole blood was collected from anesthetized rats by cardiac puncture at the time of euthanasia. Immediately after collection, the blood was mixed 9:1 with 4% sodium citrate solution to prevent coagulation. A range of different concentrations of ecarin was used to induce blood clotting. The samples were left at room temperature for 2 hours to allow full coagulation. Subsequently, the ex vivo blood clots were fixed in 4% PFA at 4° C. overnight, before being processed for scanning electron microscopy.

Scanning Electron Microscopy. The in vivo fracture hematomas and ex vivo blood clots were essentially treated in the same manner. The samples were fixed in 4% paraformaldehyde overnight. Gross morphology was captured at 100-1,000× magnification using the Hitachi SU1510 VP-SEM. For analyses of fiber diameter and density, the samples were post-fixed in 4% osmium tetroxide and dehydrated through a gradient of ethanol solutions (25-100%). Slices of the hematomas and blood clots were then dried using the Leica EM Critical Point Dryer, mounted on silicon chip specimen supports, and sputter-coated with gold-palladium before being imaged at 10,000× (Hitachi 55500 SEM/STEM) to reveal structural properties at high resolution. The images were analyzed using ImageJ. As disclosed herein the SVCE, various concentrations of ecarin were used to alter the structural properties of blood clots (ex vivo hematoma), using either whole blood or platelet rich plasma (PRP) in an effort to mimic the properties of hematomas formed in a 0.5 mm osteotomy model. Ecarin (0.1 and 0.5 U/mL) or $CaCl_2$ (10 mM) was used as coagulants. Results disclosed herein demonstrated that it is possible to create ex vivo hematoma with the required structural properties by varying concentrations of ecarin, using either whole blood or PRP.

Figure 10:
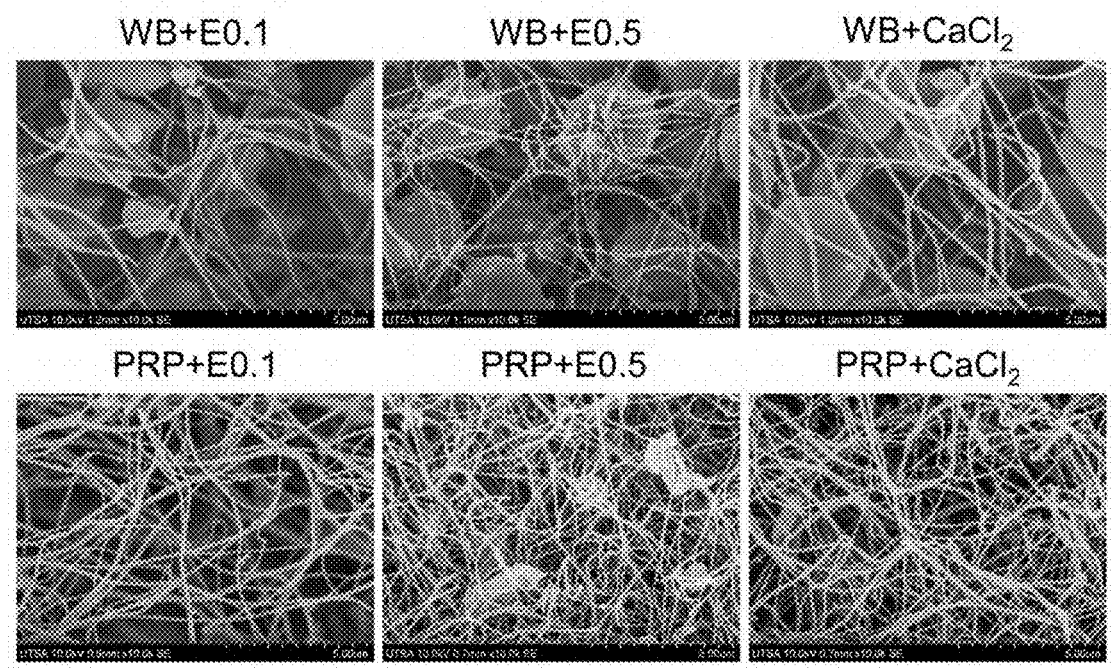
FIG. 10 shows scanning electron microscopy images depicting rat ex vivo whole blood and platelet rich plasma clots using ecarin and calcium chloride. Whole blood (WB)+0.1 U/mL ecarin (top left). Whole blood+0.5 U/mL ecarin (top center). Whole blood+10 mM calcium chloride (top right). Platelet Rich Plasma (PRP)+0.1 U/mL ecarin (bottom left). Platelet Rich Plasma+0.5 U/mL ecarin (bottom center). Platelet Rich Plasma+10 mM calcium chloride (bottom right).

FIGS. 10-11 show scanning electron microscopy images depicting the structural properties of ex vivo snake venom-induced ex vivo hematomas. These results show that the morphology of the blood clots can be manipulated using a snake venom enzyme or calcium chloride which affects fibrin fiber thickness and density (FIG. 11), and that the structural properties of the ex vivo hematomas were different from those that were created with whole blood compared to those created with PRP (FIG. 10).

Example 4: To Determine if this Ex Vivo Hematoma Provides a Viable Environment for Mesenchymal Stem Cells (MSCs)

These experiments will be performed to determine the ability of MSCs to survive in the presence of ecarin as well as when seeded within ecarin-induced blood clots to assess the biocompatibility of these scaffolds. Cell viability and the potential cytotoxicity of the ecarin at various concentrations will be measured in 2D and 3D assays. Rat bone MSCs will be cultured in the presence of different concentrations of ecarin to determine cell viability. Cell proliferation (e.g., CyQUANT™ Cell Proliferation Assay Kit) and cytotoxicity (e.g., Vybrant™ Cytotoxicity Assay Kit) will be measured at days 1, 7, 14, and 21. Subsequently, ecarin will be added to a mix of citrated blood at a concentration established from the previous experiments, taking into account cell survival along with the specific structural properties determined. After coagulation, the blood clots will be transferred into 24-well-plates containing growth medium.

To test the biocompatibility of the ecarin-induced blood clots, samples will be removed from the culture on days 1, 7, 14 and 21 (n=3/group) to study the survival rate and differentiation potential of the seeded cells, as well as their ability to form an extracellular matrix. Furthermore, the cell numbers required in the blood clots to maximize the regenerative capacity of bone tissue will be determined. Cell viability within the blood clots will be evaluated using the LIVE/DEAD® cell viability assay and confocal imaging.

To test the cells' ability to differentiate, the cells will be cultured in adipogenic, chondrogenic, and osteogenic differentiation media. qRT-PCR will be used to determine the differential expression of genes at the selected time points. Once cell viability is established, the hematoma that most resembles the structural and biological properties of natural hematomas during 0.5 mm defect/osteotomy bone healing will be implanted in an in vivo rat, 5 mm femoral defect model to study their ability to heal large segmental bone defects. Based upon results in FIGS. 5A, B, it is expected that using lower concentrations of coagulating enzyme (<0.5 U/mL), ecarin, will not be toxic to the cells.

Cell culture. Rat bone marrow stem cells will be cultured according to standard protocols. Medium will be replaced every 3-4 days.

2D Cell Viability Assay. PrestoBlue™ Cell Viability Reagent (Thermo Fisher Scientific, Inc., Waltham, MA, USA) will be added directly to the culture medium of rat bone marrow stem cells grown in well-plates at 1, 3, and 7 days. After a 20 min incubation at 37° C., fluorescence will be read in a multiplate reader according to the manufacturer's instructions.

2D Cell Toxicity Assay. Rat bone marrow stem cells will be cultured in a 96-well-plate. On day 1, day 3, and day 7, the supernatant will be collected and used to determine lactate dehydrogenase (LDH) cytotoxicity according to the manufacturer's instructions (Pierce LDH Cytotoxicity Assay Kit, Thermo Fisher Scientific A G, Reinach B L, Switzerland). Using a microplate reader, absorbance will be measured at 490 nm with background subtraction at 680 nm.

Live/Dead Staining in 3D Ex Vivo Blood Clots and Confocal Microscopy. Rat bone marrow stem cells will be cultured within 3D blood clots. At 1, 3, and 7 days the blood clots will be removed from the culture media and cut sagittally into halves before being immersed in serum-free medium containing 10 µM Calcein AM stock and 1 µM ethidium homodimer-1 (Thermo Fisher Scientific, Inc.) in a 24-well-plate. After an incubation of 3 hours at 4° C. and 1 hour at 37° C., 5% $CO_2$, and 100% humidity, the samples will be imaged up to a depth of 200 µm using a confocal microscope (Gantenbein-Ritter B, Sprecher C M, Chan S, Illien-Jünger S, Grad S. Confocal imaging protocols for live/dead staining in three-dimensional carriers. Methods Mol Biol. 2011; 740: 127-40).

3D Cell Differentiation Assays. Cell-seeded blood clots will be cultured in either adipogenic, chondrogenic, or osteogenic medium (StemPro® Differentiation Kits, Thermo Fisher Scientific, Inc.) according to the manufacturer's protocol. Cell differentiation will be evaluated using qRT-PCR and customized TaqMan® PCR array plates (Thermo Fisher Scientific, Inc.).

Real Time Quantitative PCR (qRT-PCR). Ex vivo blood clots will be collected into microcentrifuge tubes, immediately snap-frozen in liquid nitrogen and stored at −80° C. RNA extractions will be performed using the Qiagen RNeasy Plus Universal Tissue Mini (Qiagen, Inc., Germantown, MD, USA) following the manufacturer's protocol. The concentration and quality of the RNA will be determined in a nanodrop spectrophotometer (ND-1000, Thermo Fisher Scientific, Inc.) and RNA integrity will be assessed using an Agilent 2100 Bioanalyzer (Agilent Technologies, Inc., Santa Clara, CA, USA) according to the manufacturer's protocol. The TaqMan™ High-Capacity RNA-to-cDNA Kit (Thermo Fisher Scientific, Inc.) will be used to reverse-transcribe 1 µg of extracted RNA into cDNA before customized TaqMan® PCR array plates (Thermo Fisher Scientific, Inc.) will be used to analyze the expression of inflammation-, angiogenesis- and osteogenesis-related genes.

Figures 14A, 14B, 14C:
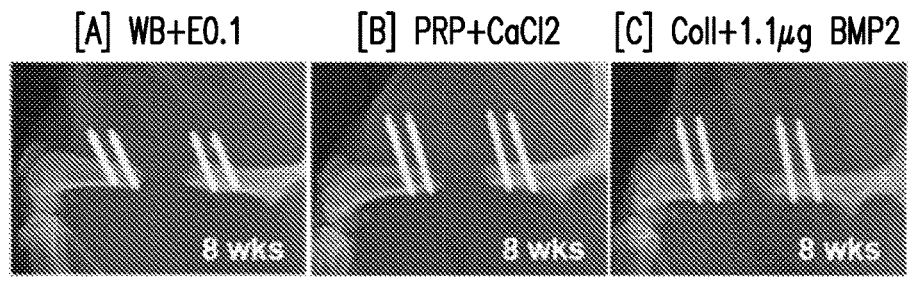
FIGS. 14A-F show bone healing using different implants.
Figures 14D, 14E, 14F:
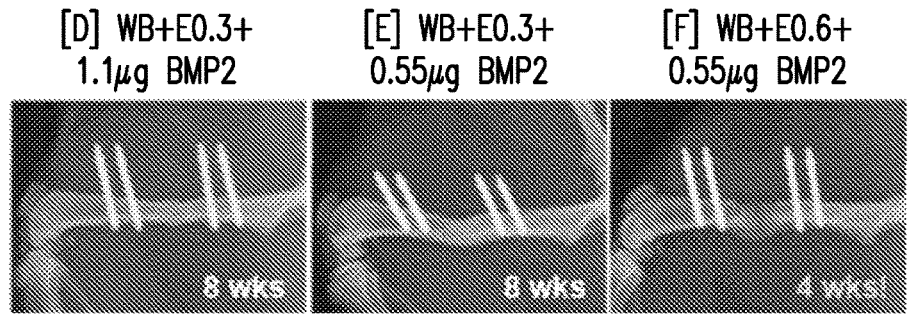

As disclosed herein, the ability of bone marrow MSCs to survive in the presence of ecarin will be further investigated, as well as when seeded within ecarin-induced blood clots, to assess the biocompatibility of these scaffolds. Using various concentrations of coagulating enzyme derived from snake venom was not toxic to the MSCs added to an ex vivo blood clot (FIG. 12-13). The enzyme, ecarin is highly purified. Thus, it can be expected that ecarin will not be toxic to the migrating cells once the ex vivo hematoma is implanted in vivo. Furthermore, in vivo experiments in a rat model were performed, which demonstrated that ecarin at 2 different concentrations (0.3 and 0.6 U/ml) did not cause toxicity (FIGS. 14D-F). However, if ecarin prove to be toxic to the cells due to higher concentrations being required to create a blood clot with specific structural and biological properties for human subjects, calcium chloride or other coagulating factors described herein will be considered as clotting agents. As mentioned herein, thrombin has previously been used to activate the coagulation cascade in platelet rich plasma; however, this product showed poor performance in bone repair (Diesen D L, Lawson J H. Vascular. 2008; and Sands J J, Nudo S A, Ashford R G, Moore K D, Ortel T L. Am J Kidney Dis. 2000; 35: 796-801). This could be related to the fact that added thrombin to PRP was purely used as an activating agent, with the structural properties of the clot not being considered. In some aspects, a small dose of growth factors such as VEGF, PDGF, hFGF-2 or BMP-2 (other BMPs) can be added.

FIGS. 12-13 show scanning electron microscopy images depicting the structural properties of ex vivo snake venom-induced ex vivo hematomas. These results show that cell viability was not significantly affected by the presence of the snake venom enzyme, suggesting biocompatibility.

Example 5: To Investigate if an Ex Vivo Produced Ex Vivo Hematoma Inserted into a Large Bone Defect Can Enhance the Regeneration Process of Bone in a Rat Femoral 5 mm Large Critical Size Defect Model Femoral defects of 5 mm created in groups of male SAS Fischer rats (10-12 weeks old, n=8-16; a pilot study n=4; ex vivo hematoma, BMP-2, PRP), and stabilized with external fixators as described herein. The ex vivo hematoma was implanted in the fracture gap to determine its ability to enhance the healing of large segmental bone defects (FIG. 6). Two control groups were used to compare the bone healing process with the experimental group. Healing in the first control group was enhanced using recombinant human BMP-2 delivered on an absorbable collagen sponge, the same product that is currently used clinically (Infuse®, Medtronic plc., Minneapolis, MN, USA). This is a well-established research model using BMP-2, that has been reported to heal within 8 weeks (Glatt V, Bartnikowski N, Quirk N, Schuetz M, Evans C. Reverse Dynamization: Influence of Fixator Stiffness on the Mode and Efficiency of Large-Bone-Defect Healing at Different Doses of rhBMP-2. J Bone Joint Surg Am. 2016; 98: 677-87; Yasko A W, Lane J M, Fellinger E J, Rosen V, Wozney J M, Wang E A. The healing of segmental bone defects, induced by recombinant human bone morphogenetic protein (rhBMP-2). A radiographic, histological, and biomechanical study in rats. J Bone Joint Surg Am. The American Orthopedic Association; 1992; 74: 659-70; and Gantenbein-Ritter B, Sprecher C M, Chan S, Illien-Jünger S, Grad S. Confocal imaging protocols for live/dead staining in three-dimensional carriers. Methods Mol Biol. 2011; 740: 127-40), and, therefore, a reduced number of animals was used (n=4). In the second control group, PRP was used to determine if the ex vivo hematoma has superior healing outcomes compared to a fibrin clot that is enriched with a high concentration of platelets. In the experimental group, the ex vivo hematoma was used to determine if the created scaffolds have the ability to regenerate bone defects. The merits of the ex vivo hematoma are the following: (1) osteoinductivity—important growth factors will persist for an extended period to stimulate new bone formation; and (2) osteoconductivity—a well-organized fibrin structure will create a microenvironment favorable for the migration of MSCs and early mineralization. It is anticipated that the successful completion of this proof-of-concept series of experiments will lead to the development of ex vivo hematoma that can act as a natural growth factor reservoir, as well as a biocompatible autologous scaffold, which will improve the healing of large segmental bone defects without the addition of growth factors, such as rhBMP-2. To evaluate this, the animals were monitored by weekly X-ray and euthanized at 8 weeks. After euthanasia, the healed defects were harvested for evaluation by micro-computed tomography (μCT; all samples) and will be used for histology/IHC (n=4/group; n=2 for BMP-2 group), and biomechanical testing (n=12/group; n=6 for BMP-2 group).

Surgery. Rat surgeries were performed as described herein.

Preparation of ex vivo hematoma for implantation. To create ex vivo blood clots, 5-10 mL whole blood was collected from anesthetized rats by cardiac puncture at the time of euthanasia. Immediately after collection the blood was mixed 9:1 with 4% sodium citrate solution to prevent coagulation. Ecarin was used at the previously determined concentrations of 0.3 and 0.6 U/ml to induce blood clotting in combination with 0.55 μg of rhBMP-2. The samples were allowed to clot for 45 min to 1 h at 22° C. (room temperature) before implantation into the 5 mm rat bone defects.

Platelet rich plasma (PRP) preparation and BMP-2. To prepare PRP from rat blood, 5-10 mL whole blood was collected from anesthetized rats by cardiac puncture at the time of euthanasia. Immediately after collection, the blood was mixed 9:1 with 4% sodium citrate solution to prevent coagulation. The whole blood was centrifuged at 150×g for 10 min at room temperature with a soft brake to separate the platelet layer from the plasma and red blood cells. The lower red blood cell layer was discarded while the middle platelet layer and the upper plasma layer was collected. The platelet number in whole blood and PRP was determined using a cell counting chamber to check the quality of the PRP. Calcium chloride was added to create a PRP gel, which was implanted into the defect gap. Recombinant human BMP-2 (5.5 μg) was applied to an absorbable collagen sponge carrier (Infuse™ Bone Graft, Medtronic, Minneapolis, MN, USA) in the shape of the bone defect, which was used as an implant.

Assessment of bone healing. Femora in each group of sixteen animals will be assessed in vivo by weekly X-ray and, after euthanasia, by μCT. Twelve samples will be subjected to biomechanical testing and four will be used for histology. For a pilot study, 4 animals per group were used.

X-ray. Bone healing was monitored by weekly radiography. Under general anesthesia as described in the surgical procedure, the rats were placed in a ventral position and the hind limbs laterally rotated to permit reproducible and standard images normal to the defect.

Micro-Computed Tomography (μCT). Femora will be scanned using a desktop micro-tomographic imaging system (Bruker Skyscan 1172, Belgium) equipped with a 10 mm focal spot microfocus X-ray tube. Femora will be scanned using a 16 μm isotropic voxel size at 75 keV energy and 250 ms integration time, with approximately 600 μCT slices per specimen. Evaluation will be applied in the 4 mm central defect region to ensure that no pre-existing cortical bone is included in the analyses. To evaluate the region of interest, the variables of the total cross-sectional volume of the defect (TV, $mm^3$) and the bone volume (BV, $mm^3$), bone volume fraction (BV/TV, %), bone mineral density (BMD, mg HA/ccm), and polar moment of inertia (pMOI, $mm^4$) will be assessed. Images will be thresholded using an adaptive-iterative algorithm, and morphometric variables will be computed from the binarized images using direct 3D techniques that do not rely on any prior assumptions about the underlying structure.

Mechanical Testing. Following the non-invasive imaging, 12 specimens from each group will be tested in torsion to failure. The ends of each specimen will be embedded in polymethymethacrylate to provide an appropriate and reproducible gripping interface with the testing module. Specimens will be tested to failure under regular deformation control and at a constant deformation rate of 5 rad/min. Angular deformation and applied load data will be acquired at 10 Hz. The torque and rotation data will be used to compute the torsional stiffness and strength of the healed defects.

Histology of bone samples. Femora (n=4) will be fixed in ice-cold 4% paraformaldehyde for 48 hours, followed by decalcification in 14% EDTA for up to four weeks. Pins will be removed from the bones before embedding and sectioning. Fixed and decalcified tissues will be dehydrated in graded ethanol up to 100%, transferred to xylene, and embedded in paraffin. Five-micron paraffin sections will be placed on poly L-lysine coated slides, dried overnight and stained immediately, or stored at 4° C. Alternate sections will be stained with hematoxylin and eosin or safranin O and fast green before being examined by light microscopy. Safranin O is included to stain cartilage as part of monitoring the endochondral ossification process.

Power analysis and statistics. Sample sizes for all individual groups are based on coefficients of variation of 15% in the types of data collected and using an alpha level of 0.05 and power of 80% (beta=0.20). Power analysis revealed that n=8-16 animals per group will allow detection of significant differences between groups for each outcome parameter, based upon an effect size of 1.3 using the Student t-test. Previous experience with these rat models confirms that a n of 10 gives ample statistical power. The in vitro experiments will be performed in triplicates and compared for statistical significance using ANOVA tests. Sample size and power calculations were determined using version 4.0 of the nQuery Advice software program (Statistical Solutions, Boston, MA). Statistical analysis will be performed using SAS version 6.12 software (SAS Institute, Cary, NC). A two-tailed p<0.05 will be considered statistically significant.

Experiments to determine in vitro dose response are important to create an ex vivo hematoma with specific structural properties that mimic the structural properties of a naturally healing fracture hematoma. If healing cannot be achieved using the ex vivo blood clot alone, the ex vivo hematoma will be combined with either rat bone marrow mesenchymal stem cells, a significantly reduced amount of rhBMP-2 compared to the supra-physiological doses currently used clinically, or other growth factors.

As disclosed herein, the in vivo results from the in vivo study at the end of 8 weeks and 4 weeks (group with 0.6 U/ml+0.55 µg of BMP-2) bone defect healing times (FIGS. 14A-F) clearly demonstrate that whole blood+ecarin (0.1 U/mL) (FIG. 14A) and Platelet Rich Plasma (PRP)+CalCl$_2$ (10 mM) (FIG. 14B) do not enhance bone healing/regeneration at the concentrations of the coagulating factors tested. By contrast, when 0.3 U/mL of ecarin and either 1.1 µg (FIG. 14D) or 0.55 µg (FIG. 14E) of BMP-2 was added to the defects, the 5 mm femoral rat defects healed. It is important to note that BMP-2 delivered on the collagen sponge sold by Medtronic (Infuse™) using the same amounts of BMP-2 did not initiate the healing of bone defects (FIG. 14C). Interestingly, when using 0.6 U/mL ecarin+0.55 µg BMP-2 (FIG. 14F), the healing was much better compared to that observed with the lower concentration of ecarin. This result seems to indicate that the ultra-structural properties of the blood clots (ex vivo hematomas) have a great influence on enhancing the healing of bone defects.

Figure 15:
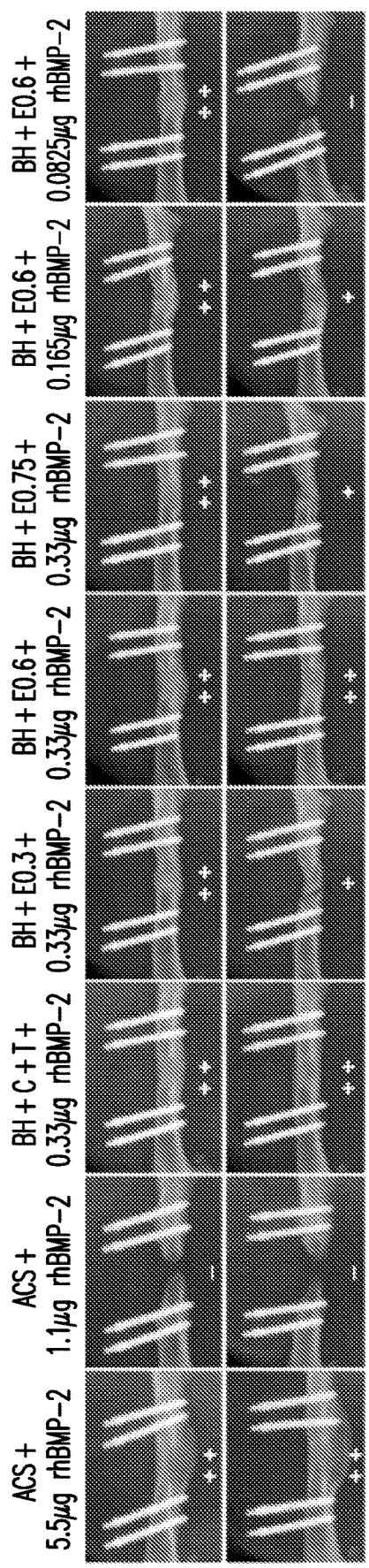
FIG. 15 shows radiographic images illustrating large bone defect healing after 8 weeks of treatment. Representative images are shown for two different animals in each study group. '++'=bridged defect; '+'=slightly delayed healing (a small amount of cartilage remaining); '−'=non-union.

Example 6: Biomimetic Hematoma: Influence of Coagulant and rhBMP-2 Concentration on Bone Healing Versus rhBMP-2/ACS A range of concentrations of the coagulants, ecarin and calcium/thrombin, as well as BMP-2 were tested, and demonstrate the ability to initiate the healing of large segmental bone defects. The concentrations of ecarin tested included 0.3, 0.6, and 0.75 U/mL, and these concentrations successfully initiated healing (FIG. 15, 4-8th columns); however, the concentration of 0.6 U/mL of ecarin showed the best result of the doses tested. Likewise, a combination of coagulants, 10 mM CaCl$_2$ and 0.5 U/mL thrombin (FIG. 15, 3rd column), also effectively healed large bone defects in a manner similar to 0.6 U/mL of ecarin with 0.33 µg of BMP-2 (FIG. 15, 4th column). The concentration of BMP-2 that consistently initiated healing of 5 mm bone defects in this rat model is 0.33 µg. This dose is 33 times lower than the standard dose of 11 µg, and this dose is 17 times lower than the lowest effective dose of BMP-2/ACS (ACS=absorbable collagen sponge) that efficiently heals large segmental bone in a 5 mm femoral defect rat model (5.5 µg; FIG. 15, 1st column). The other two doses tested that initiated the healing of bone defects were 0.165 and 0.0825 µg (FIG. 15, 7th and 8th columns); however, the response with these doses was less consistent, and 75% and 50% respectively compared to 0.33 µg (see, for example column 5).

What is claimed is:

1. A composition consisting of: (a) isolated whole blood; (b) sodium citrate; (c) thrombin and calcium chloride; and (d) bone morphogenetic protein 2 (BMP-2).

2. The composition of claim 1, wherein the whole blood comprises viable cells and one or more biological factors.

3. The composition of claim 2, wherein about 50% to 70% of the viable cells of the whole blood remain viable after formation of the hematoma.

4. The composition of claim 1, wherein the dose of BMP-2 present in the composition is at least 0.01 mg.

5. The composition of claim 1, wherein the composition is formulated as a gel or a liquid.

6. A method of promoting bone healing or producing bone replacement material or implants, the method comprising administering to a subject in need thereof a therapeutically effective amount of the composition of claim 1.

7. The method of claim 6, wherein the amount of BMP-2 present in the composition is at least 0.01-5 mg.

8. The method of claim 6, wherein the subject has a skeletal defect.

9. The method of claim 6, wherein the subject has one or more bone injuries.

10. A method of constructing an implant, the method comprising: a) dimensioning a depot implant in at least one of a shape and a size that facilitates implantation of the depot implant into a bone defect; and b) structuring the depot implant to have a scaffold by introducing (i) isolated whole blood and sodium citrate; (ii) thrombin and calcium chloride; and (iii) bone morphogenetic protein 2 (BMP-2) to create the scaffold; wherein the scaffold has a porosity of 55 to 75%.

11. The method of claim 10, wherein the scaffold is constructed as a clot.

12. The method of claim 10, further comprising one or more growth factors, wherein the one or more growth factors is BMP-7, BMP-4, BMP-6, BMP-9, BMP-14, platelet-derived growth factor (PDGF), vascular endothelial growth factor (VEGF), fibroblast growth factor 2 (FGF-2), or a combination thereof.

13. The method of claim 10, wherein the amount of BMP-2 present in the scaffold is at least 0.01 mg.

* * * * *